(12) United States Patent
Shimotani et al.

(10) Patent No.: US 10,503,983 B2
(45) Date of Patent: Dec. 10, 2019

(54) LANE RECOGNITION APPARATUS AND LANE RECOGNITION METHOD

(71) Applicant: MITSUBISHI ELECTRIC CORPORATION, Tokyo (JP)

(72) Inventors: Mitsuo Shimotani, Tokyo (JP); Keisuke Inoue, Tokyo (JP); Yasushi Kodaka, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 65 days.

(21) Appl. No.: 15/740,199

(22) PCT Filed: Aug. 19, 2015

(86) PCT No.: PCT/JP2015/073264
§ 371 (c)(1),
(2) Date: Dec. 27, 2017

(87) PCT Pub. No.: WO2017/029734
PCT Pub. Date: Feb. 23, 2017

(65) Prior Publication Data
US 2018/0181818 A1 Jun. 28, 2018

(51) Int. Cl.
*G06K 9/00* (2006.01)
*G01S 13/86* (2006.01)
(Continued)

(52) U.S. Cl.
CPC ......... *G06K 9/00798* (2013.01); *B60W 30/12* (2013.01); *G01S 7/412* (2013.01);
(Continued)

(58) Field of Classification Search
CPC .. G06K 9/00; G01S 13/86; G01S 1/00; G08G 1/16; B60Q 1/00; H04N 7/18
See application file for complete search history.

(56) References Cited

U.S. PATENT DOCUMENTS 6,138,062 A   10/2000   Usami
6,172,600 B1   1/2001   Kakinami et al.
(Continued)

FOREIGN PATENT DOCUMENTS

JP    10-31799 A    2/1998
JP    10-67252 A    3/1998
(Continued)

OTHER PUBLICATIONS

International Search Report for PCT/JP2015/073264 (PCT/ISA/210) dated Nov. 24, 2015.

*Primary Examiner* — Yuri Kan
(74) *Attorney, Agent, or Firm* — Birch, Stewart, Kolasch & Birch, LLP

(57) ABSTRACT

A lane recognition apparatus according to the present invention includes: a subject vehicle position calculation unit that calculates a current position of a subject vehicle; a traveling lane estimation unit that estimates a lane in which the subject vehicle is traveling and a position, in a direction perpendicular to a traveling direction, of the subject vehicle in the lane based on the current position of the subject vehicle, subject vehicle surroundings information indicating a positional relationship between a road structure being a three-dimensional structure existing in relation to a road and the subject vehicle, and road information associating the road structure with a lane of a road in terms of a positional relationship therebetween; and a traveling lane final determination unit that determines the lane in which the subject vehicle is traveling and the position of the subject vehicle in the lane based on results of estimation.

18 Claims, 18 Drawing Sheets

(51) Int. Cl.
  *G08G 1/16* (2006.01)
  *G06T 7/70* (2017.01)
  *B60W 30/12* (2006.01)
  *G01S 7/41* (2006.01)
  *G01S 13/93* (2006.01)

(52) U.S. Cl.
  CPC ........ *G01S 13/931* (2013.01); *G06K 9/00805* (2013.01); *G06T 7/70* (2017.01); *G08G 1/167* (2013.01); *G01S 2013/9357* (2013.01); *G01S 2013/9364* (2013.01); *G01S 2013/9367* (2013.01); *G01S 2013/9385* (2013.01); *G06T 2207/30256* (2013.01)

(56) References Cited

U.S. PATENT DOCUMENTS

| | | | | |
|---|---|---|---|---|
| 6,813,370 | B1* | 11/2004 | Arai | G06T 7/593 382/104 |
| 2003/0227378 | A1* | 12/2003 | Nakai | G06K 9/00805 340/435 |
| 2005/0152580 | A1* | 7/2005 | Furukawa | G06K 9/3241 382/103 |
| 2005/0228588 | A1* | 10/2005 | Braeuchle | B60W 30/095 701/301 |
| 2010/0110193 | A1* | 5/2010 | Kobayashi | G06K 9/00798 348/149 |
| 2013/0274959 | A1 | 10/2013 | Igarashi | |
| 2014/0306844 | A1* | 10/2014 | Kim | G01S 13/867 342/385 |
| 2015/0178575 | A1* | 6/2015 | Fukata | H04N 7/18 382/103 |
| 2015/0235091 | A1* | 8/2015 | Kumano | G06K 9/00798 340/435 |

FOREIGN PATENT DOCUMENTS

| | | | | |
|---|---|---|---|---|
| JP | 2000-131436 A | | 5/2000 | |
| JP | 2011-210165 A | | 10/2011 | |
| JP | 2011210165 | * | 10/2014 | ............... G08G 1/16 |
| JP | 2015-018333 A | | 1/2015 | |
| JP | 2015018333 | * | 1/2015 | ............... G08G 1/16 |
| WO | WO 2012/081096 A1 | | 6/2012 | |

* cited by examiner

FIG. 19

| | PARAMETERS FOR RELIABILITY CALCULATION | PARAMETER RANGE |
|---|---|---|
| P1e | RELIABILITY OF RESULTS OF DETECTION OUTPUT FROM SURROUNDING ENVIRONMENT DETECTION APPARATUS 7 ITSELF | 0~3 |
| P1d | RELIABILITY EXPECTED IN RELATION TO RECOGNITION OF ROAD STRUCTURES STORED IN ROAD STRUCTURE DB 8 (VALUE IS SMALL WHEN THE NUMBER OF ROAD STRUCTURES IS SMALL) | 0.0~1.0 |
| P2e | RELIABILITY OF RESULTS OF DETECTION BY IMAGE RECOGNITION APPARATUS 14 ITSELF | 0~5 |
| P2d | RELIABILITY EXPECTED IN RELATION TO RECOGNITION OF ROAD MARKINGS STORED IN ROAD MARKING DB 16 (VALUE IS SMALL WHEN THERE ARE BLURRING OF WHITE LINES AND SO ON) | 0.0~1.0 |
| DIS1d | RELIABILITY REDUCTION VALUE FOR SURROUNDING ENVIRONMENT DETECTION APPARATUS 7 BY INHIBITION OF DETECTION BY SURROUNDING MOVING OBJECT, OBSTACLE, AND SO ON | 0~1 |
| DIS2d | RELIABILITY REDUCTION VALUE FOR IMAGE RECOGNITION APPARATUS 14 BY INHIBITION OF DETECTION BY SURROUNDING MOVING OBJECT OR OBSTACLE, WEATHER, AND SO ON | 0~3 |

LANE RECOGNITION APPARATUS AND LANE RECOGNITION METHOD

TECHNICAL FIELD

The present invention relates to a lane recognition apparatus that recognizes a lane in which a subject vehicle is traveling and a position of the subject vehicle in the lane, and a lane recognition method.

BACKGROUND ART

Technology of recognizing white lines (lane boundary lines) using, for example, a camera mounted on a vehicle to determine a lane in which a subject vehicle is traveling, and applying the results of recognition to a lane departure warning system (LDWS) or a lane keeping assist system (LKAS) has been reported. Such a lane departure warning system or a lane keeping assist system is highly useful as a system to reduce a driving burden on a driver. In an application to a car navigation system, route guidance can be achieved for each lane by detecting one of a plurality of lanes in which the subject vehicle is traveling.

These systems operate very effectively when the white lines can clearly be recognized, but cannot provide sufficient functionality to the driver when the white lines cannot be recognized due to blurring and the like caused depending on weather conditions or by aging of the white lines.

To address the above-mentioned problem, disclosed is technology of detecting, on the assumption that a road has a side wall, the distance from the subject vehicle to the side wall using a laser radar, and detecting a position of a lane in which the subject vehicle exists or an obstacle ahead of the subject vehicle to avoid the obstacle while estimating the position of the subject vehicle in the lane (see, for example, Patent Document 1).

Also disclosed is technology of detecting a traveling-prohibited region including, for example, a guard rail, a fence, a side wall, a curbstone, a walker, a bicycle, and another vehicle using a surrounding environment detection apparatus installed in a vehicle, and acquiring reliability of results of detection by the surrounding environment detection apparatus based on discontinuity of the traveling-prohibited region to determine a traveling route (see, for example, Patent Document 2).

PRIOR ART DOCUMENTS

Patent Documents

Patent Document 1: Japanese Unexamined Patent Application Publication No. 10-31799
Patent Document 2: WO 2012/081096

SUMMARY

Problem to be Solved by the Invention

In Patent Documents 1 and 2, the surroundings of the subject vehicle are detected using the laser radar or the surrounding environment detection apparatus to search for a region in which traveling is allowed, and, when the white lines cannot be recognized, only the results of detection by the laser radar or the surrounding environment detection apparatus are used. In Patent Documents 1 and 2, however, the position of the subject vehicle in the lane cannot be detected, and sufficient driving assistance cannot be provided when the relationship between a white line and a road structure, such as a side wall, has changed.

The present invention has been conceived to solve such a problem, and aims to provide a lane recognition apparatus that can recognize a lane in which a subject vehicle is traveling and a position of the subject vehicle in the lane accurately, and a lane recognition method.

Means to Solve the Problem

To solve the above-mentioned problem, a lane recognition apparatus according to the present invention includes: a subject vehicle position calculation unit that calculates a current position of a subject vehicle; a traveling lane estimation unit that estimates a lane in which the subject vehicle is traveling and a position, in a direction perpendicular to a traveling direction, of the subject vehicle in the lane based on the current position of the subject vehicle calculated by the subject vehicle position calculation unit, subject vehicle surroundings information indicating a positional relationship between a road structure being a three-dimensional structure existing in relation to a road or a planar pattern being a two-dimensionally visible pattern existing in relation to a road and the subject vehicle, and road information associating the road structure or the planar pattern with a lane of a road in terms of a positional relationship therebetween; and a traveling lane final determination unit that determines the lane in which the subject vehicle is traveling and the position of the subject vehicle in the lane based on results of estimation by the traveling lane estimation unit.

A lane recognition method according to the present invention includes: calculating a current position of a subject vehicle; estimating a lane in which the subject vehicle is traveling and a position, in a direction perpendicular to a traveling direction, of the subject vehicle in the lane based on the calculated current position of the subject vehicle, subject vehicle surroundings information indicating a positional relationship between a road structure being a three-dimensional structure existing in relation to a road or a planar pattern being a two-dimensionally visible pattern existing in relation to a road and the subject vehicle, and road information associating the road structure or the planar pattern with a lane of a road in terms of a positional relationship therebetween; and determining the lane in which the subject vehicle is traveling and the position of the subject vehicle in the lane based on results of the estimation.

Effects of the Invention

According to the present invention, the lane recognition apparatus includes: the subject vehicle position calculation unit that calculates the current position of the subject vehicle; the traveling lane estimation unit that estimates the lane in which the subject vehicle is traveling and the position, in the direction perpendicular to the traveling direction, of the subject vehicle in the lane based on the current position of the subject vehicle calculated by the subject vehicle position calculation unit, the subject vehicle surroundings information indicating the positional relationship between the road structure being the three-dimensional structure existing in relation to the road or the planar pattern being the two-dimensionally visible pattern existing in relation to the road and the subject vehicle, and the road information associating the road structure or the planar pattern with the lane of the road in terms of the positional relationship therebetween; and the traveling lane final determination unit that determines the lane in which the subject vehicle is traveling and the position of the subject vehicle in the lane based on the results of estimation by the traveling lane estimation unit, and thus can recognize the lane in which the subject vehicle is traveling and the position of the subject vehicle in the lane accurately.

The lane recognition method includes: calculating the current position of the subject vehicle; estimating the lane in which the subject vehicle is traveling and the position, in the direction perpendicular to the traveling direction, of the subject vehicle in the lane based on the calculated current position of the subject vehicle, the subject vehicle surroundings information indicating the positional relationship between the road structure being the three-dimensional structure existing in relation to the road or the planar pattern being the two-dimensionally visible pattern existing in relation to the road and the subject vehicle, and the road information associating the road structure or the planar pattern with the lane of the road in terms of the positional relationship therebetween; and determining the lane in which the subject vehicle is traveling and the position of the subject vehicle in the lane based on the results of the estimation, and thus enables accurate recognition of the lane in which the subject vehicle is traveling and the position of the subject vehicle in the lane.

Objects, features, aspects and advantages of the present invention will become more apparent from the following detailed description and the accompanying drawings.

BRIEF DESCRIPTION OF DRAWINGS

FIG. 19 shows examples of a parameter for reliability calculation in Embodiment 4 of the present invention.

DESCRIPTION OF EMBODIMENTS

Embodiments of the present invention will be described below based on the drawings.

Embodiment 1

The configuration of a lane recognition apparatus according to Embodiment 1 of the present invention will be described first.

Figure 1:
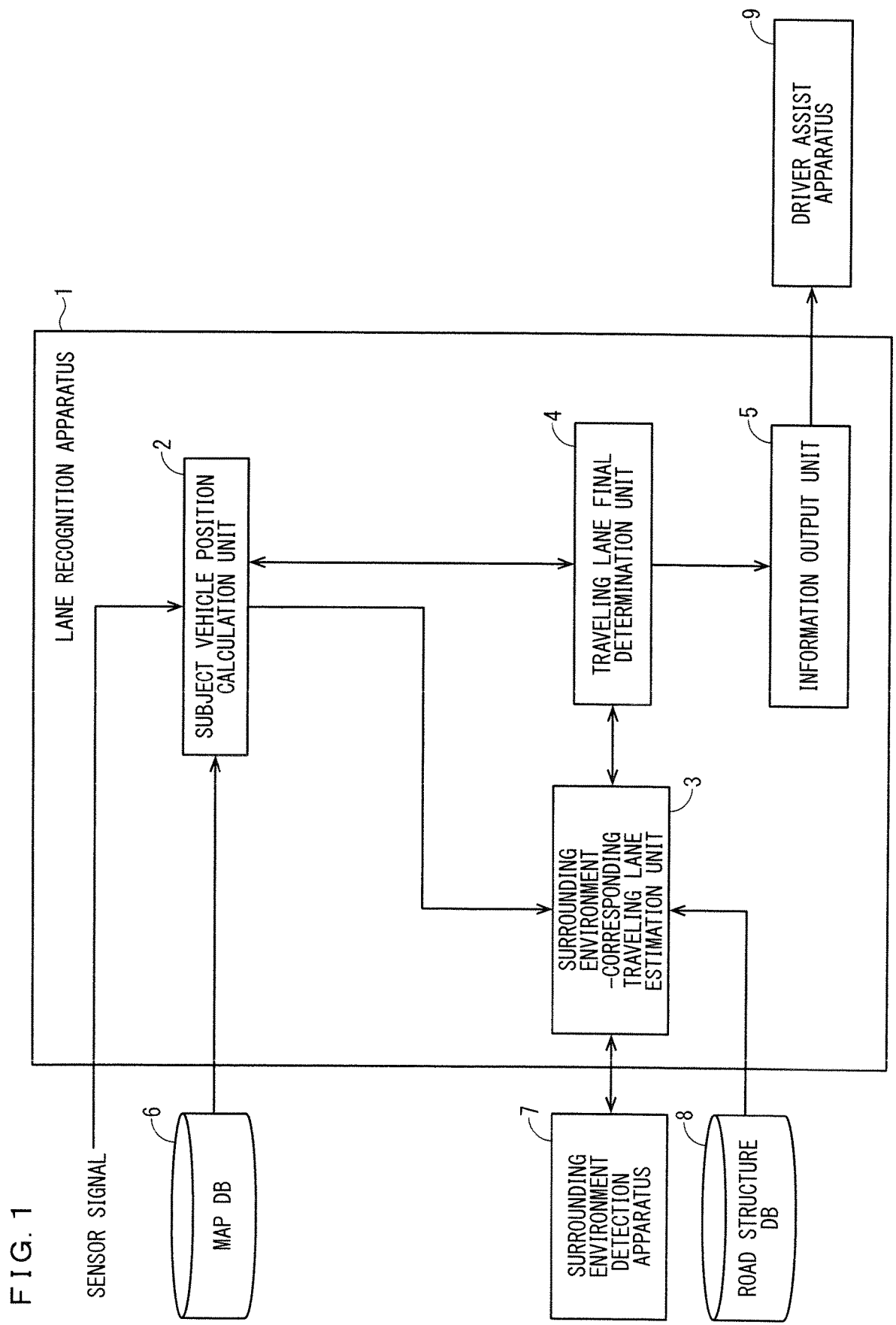
FIG. 1 is a block diagram showing an example of the configuration of a lane recognition apparatus according to Embodiment 1 of the present invention.

FIG. 1 is a block diagram showing an example of the configuration of a lane recognition apparatus 1 according to Embodiment 1.

As shown in FIG. 1, the lane recognition apparatus 1 includes a subject vehicle position calculation unit 2, a surrounding environment-corresponding traveling lane estimation unit 3, a traveling lane final determination unit 4, and an information output unit 5.

The subject vehicle position calculation unit 2 calculates a current position of a subject vehicle. Specifically, the subject vehicle position calculation unit 2 calculates a current absolute position of the subject vehicle (hereinafter, also referred to as a subject vehicle position) based on a sensor signal and map information acquired from a map DB 6. The subject vehicle position calculation unit 2 also acquires, from the map DB 6, an attribute of a road on which the subject vehicle exists. The sensor signal is herein a generic term for signals (a GNSS signal, a vehicle speed pulse, and an acceleration sensor signal) output from a global navigation system (GNSS), a vehicle speed sensor, and an acceleration sensor installed in the subject vehicle. When the GNSS and the sensors each have a high detection accuracy, and the accuracy of the map information stored in the map DB 6 is high, a lane in which the subject vehicle exists can be specified. When the GNSS and the sensors each have a high detection accuracy, the subject vehicle position calculation unit 2 may calculate the subject vehicle position only from the sensor signal. The subject vehicle position calculation unit 2 may receive feedback of results of a final determination made by the traveling lane final determination unit 4.

The map DB 6 stores road information including a road link, a road node, a road shape, and a road attribute (a road type, a lane width, and the number of lanes). Although the map DB 6 is located outside the lane recognition apparatus 1 in FIG. 1, the map DB 6 may be included in the lane recognition apparatus 1.

Figure 2:
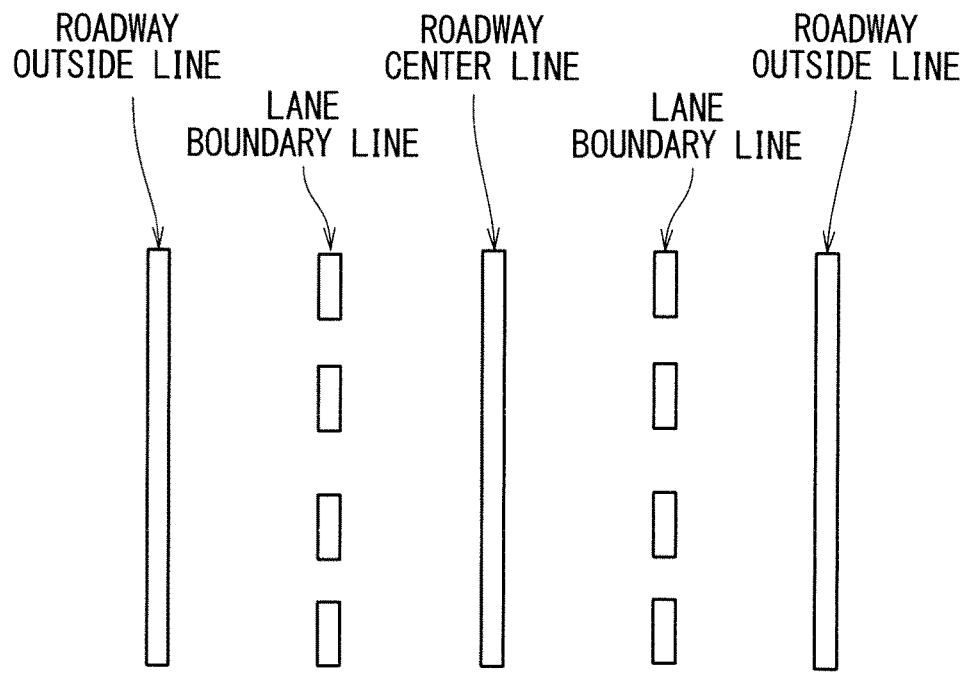
FIG. 2 is a diagram for explaining white lines in Embodiment 1 of the present invention.

For example, as illustrated in FIG. 2, roadway outside lines, lane boundary lines, and a roadway center line are indicated on a road having two lanes in each direction. These lines are so-called white lines, and define lanes.

The surrounding environment-corresponding traveling lane estimation unit 3 (a road structure-related traveling lane estimation unit) estimates a lane in which the subject vehicle is traveling and a position in a direction perpendicular to a traveling direction (hereinafter, also referred to as a lateral position) of the subject vehicle in the lane based on the subject vehicle position calculated by the subject vehicle position calculation unit 2, results of detection by a surrounding environment detection apparatus 7, and road information stored in a road structure DB 8 (details will be described below).

The surrounding environment detection apparatus 7 (a surrounding environment detection unit) is installed in the subject vehicle, and detects the presence of an object including a three-dimensional structure (hereinafter, also referred to as a road structure) around the subject vehicle, and the distance between the object and the subject vehicle or relative positions of the object and the subject vehicle. An example of the surrounding environment detection apparatus 7 herein includes a ranging apparatus, such as a laser radar, a millimeter wave radar, a ultrasonic sensor, and a binocular camera. Although the surrounding environment detection apparatus 7 is located outside the lane recognition apparatus 1 in FIG. 1, the surrounding environment detection apparatus 7 may be included in the lane recognition apparatus 1.

The road structure DB 8 (a road structure storage) stores road structures, which can be detected by the surrounding environment detection apparatus 7, around the road and lanes in association with each other. Examples of the road structures herein include a side wall, a guard rail, a sign, a street light, and a reflector. The road structure DB 8 includes a storage apparatus, such as a hard disk drive (HDD) and semiconductor memory. Although the road structure DB 8 is located outside the lane recognition apparatus 1 in FIG. 1, the road structure DB 8 may be included in the lane recognition apparatus 1.

Figure 3:
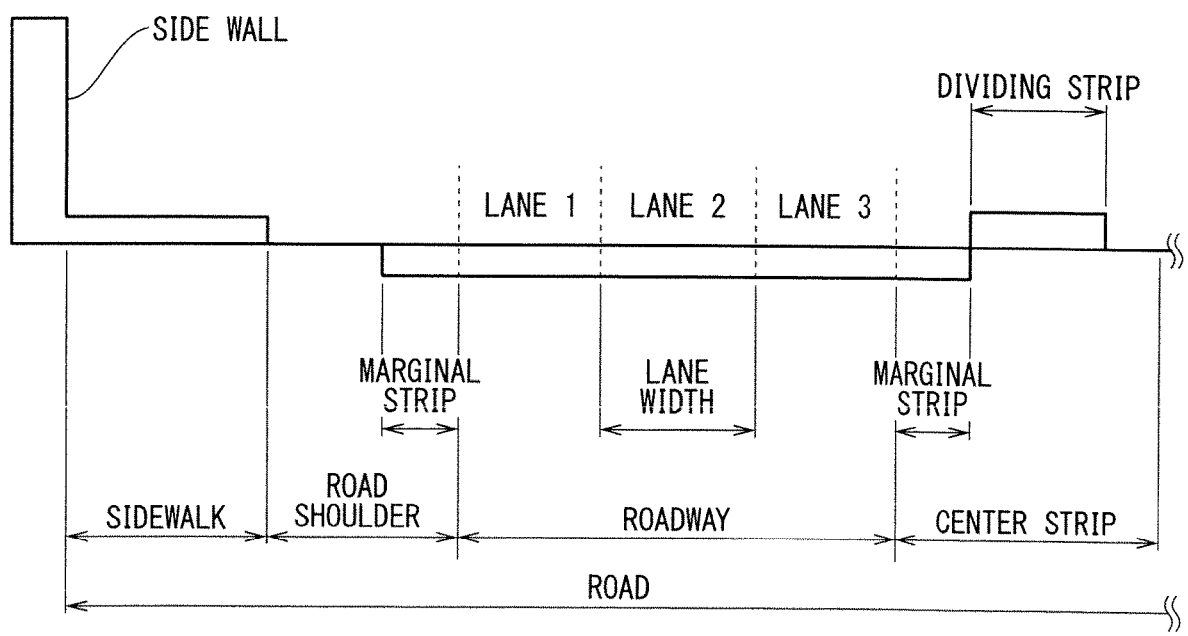
FIG. 3 illustrates an example of road information stored in a road structure DB in Embodiment 1 of the present invention.

FIG. 3 illustrates an example of the road information stored in the road structure DB 8.

As illustrated in FIG. 3, a road having three lanes in each direction, and having a sidewalk, a side wall, and a center strip is assumed, for example. In this case, the road structure DB 8 stores, as the road information, the distance between a roadway outside line and the sidewalk, the height of the sidewalk, the distance between the roadway outside line and the side wall, the height of the side wall, the distance between the roadway outside line and a dividing strip, the height of the dividing strip, the number of lanes, and a lane width of each lane, for example. That is to say, the road structure DB 8 stores the road information associating the road structures with the lanes (the roadway outside line in the example of FIG. 3). The road information is associated with position information.

The traveling lane final determination unit 4 makes a final determination of the lane in which the subject vehicle is traveling and the lateral position of the subject vehicle in the lane based on results of estimation by the surrounding environment-corresponding traveling lane estimation unit 3 (details will be described below).

The information output unit 5 (an output unit) outputs information on the lane in which the subject vehicle is traveling and the lateral position of the subject vehicle in the lane finally determined by the traveling lane final determination unit 4 to an external apparatus (a driver assist apparatus in the example of FIG. 1).

The driver assist apparatus 9 is a LKAS, a LDWS, or a navigation system providing route guidance and the like for each lane.

Figure 4:
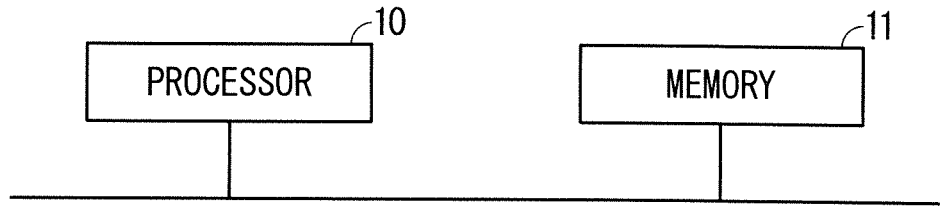
FIG. 4 is a block diagram showing an example of the hardware configuration of the lane recognition apparatus according to Embodiment 1 of the present invention.

FIG. 4 is a block diagram showing an example of the hardware configuration of the lane recognition apparatus 1.

The functions of the subject vehicle position calculation unit 2, the surrounding environment-corresponding traveling lane estimation unit 3, the traveling lane final determination unit 4, and the information output unit 5 included in the lane recognition apparatus 1 are achieved by a processing circuit. That is to say, the lane recognition apparatus 1 includes the processing circuit to calculate the subject vehicle position, estimate the lane in which the subject vehicle is traveling and the lateral position of the subject vehicle in the lane based on the subject vehicle position, the results of detection by the surrounding environment detection apparatus 7, and the road information stored in the road structure DB 8, make a final determination of the lane in which the subject vehicle is traveling and the lateral position of the subject vehicle in the lane, and output the lane in which the subject vehicle is traveling and the lateral position of the subject vehicle in the lane. The processing circuit is a processor 10 (also referred to as a central processing unit, a processing unit, an arithmetic unit, a microprocessor, a microcomputer, and a digital signal processor (DSP)) to execute a program stored in memory 11.

The functions of the subject vehicle position calculation unit 2, the surrounding environment-corresponding traveling lane estimation unit 3, the traveling lane final determination unit 4, and the information output unit 5 included in the lane recognition apparatus 1 are achieved by software, firmware, or a combination of the software and the firmware. The software or the firmware is described as the program, and stored in the memory 11. The processing circuit achieves the functions of these units by reading and executing the program stored in the memory 11. That is to say, the lane recognition apparatus 1 includes the memory 11 to store the program that results in performance of a step of calculating the subject vehicle position, a step of estimating the lane in which the subject vehicle is traveling and the lateral position of the subject vehicle in the lane based on the subject vehicle position, the results of detection by the surrounding environment detection apparatus 7, and the road information stored in the road structure DB 8, a step of making a final determination of the lane in which the subject vehicle is traveling and the lateral position of the subject vehicle in the lane, and a step of outputting the lane in which the subject vehicle is traveling and the lateral position of the subject vehicle in the lane. It can be said that the program makes a computer execute procedures or methods of the subject vehicle position calculation unit 2, the surrounding environment-corresponding traveling lane estimation unit 3, the traveling lane final determination unit 4, and the information output unit 5. The memory herein corresponds, for example, to nonvolatile or volatile semiconductor memory, such as random access memory (RAM), read only memory (ROM), flash memory, erasable programmable read only memory (EPROM), and electrically erasable programmable read only memory (EEPROM), a magnetic disk, a flexible disk, an optical disc, a compact disc, a mini disk, a digital versatile disk (DVD), and the like.

The operation of the lane recognition apparatus 1 will be described next.

Figure 5:
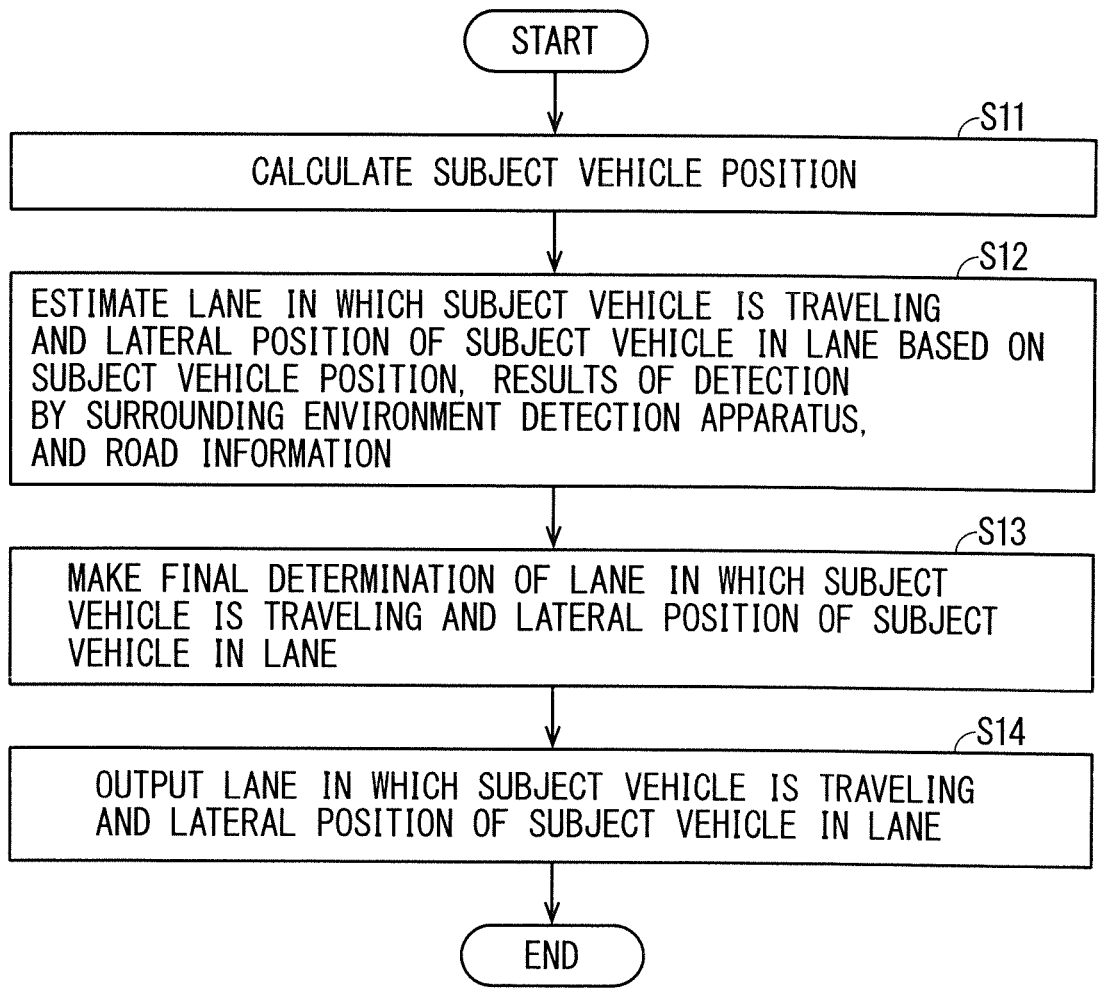
FIG. 5 is a flowchart showing an example of the operation of the lane recognition apparatus according to Embodiment 1 of the present invention.

FIG. 5 is a flowchart showing an example of the operation of the lane recognition apparatus 1. Assume that the operation of FIG. 5 is performed periodically at predetermined time intervals, for ease of explanation. The processing, however, may not have to be performed at regular intervals, and may be performed at shorter intervals with increasing speed of the subject vehicle or with increasing curvature of the road. The processing may be performed at shorter intervals depending on whether there are non-subject vehicles around the subject vehicle, the positions of non-subject vehicles, and a traveling environment or state. For example, in the car navigation system, the processing may be performed with high frequency before the timing of lane guidance.

In step S11, the subject vehicle position calculation unit 2 calculates a current subject vehicle position. For example, the subject vehicle position calculation unit 2 calculates coordinates P1 (x, y) of the subject vehicle position.

Figure 6:
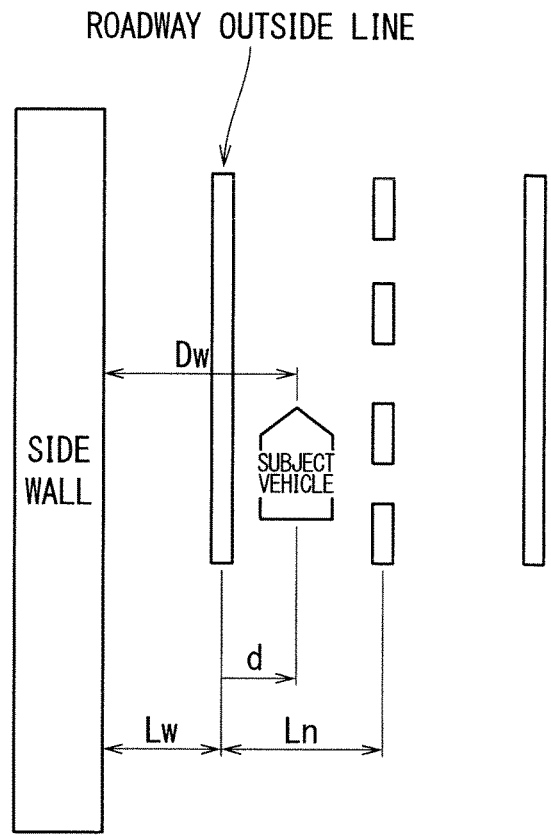
FIG. 6 is a diagram for explaining estimation of a lane in which a subject vehicle exists in Embodiment 1 of the present invention.

In step S12, the surrounding environment-corresponding traveling lane estimation unit 3 estimates the lane in which the subject vehicle is traveling and the lateral position of the subject vehicle in the lane based on the subject vehicle position, the results of detection by the surrounding environment detection apparatus 7, and the road information. Specifically, the surrounding environment-corresponding traveling lane estimation unit 3 acquires, from the road structure DB 8, road information corresponding to the coordinates P1 (x, y) of the subject vehicle position calculated by the subject vehicle position calculation unit 2. For example, as illustrated in FIG. 6, when a road at a point of the coordinates P1 (x, y) is a road having two lanes in each direction, and has a side wall, the surrounding environment-corresponding traveling lane estimation unit 3 acquires, from the road structure DB 8, road information including the number of lanes N (N=2 in the example of FIG. 6), a lane width Ln of a lane n, the presence or absence of a side wall (there is a side wall in the example of FIG. 6), and a distance Lw between the side wall and a roadway outside line. The surrounding environment detection apparatus 7 searches for an object around the subject vehicle at the coordinates P1 (x, y), and detects a distance Dw between the subject vehicle and the side wall. The surrounding environment-corresponding traveling lane estimation unit 3 acquires the distance Dw (subject vehicle surroundings information) detected by the surrounding environment detection apparatus 7.

The surrounding environment detection apparatus 7 calculates a distance d between the center of the roadway outside line and the center of the subject vehicle (the lateral position of the subject vehicle in the lane) based on an equality d=Dw−Lw.

When the lane n is one of the two lanes, an equality "the lane n=1" holds when an inequality "0<d≤L1" is satisfied, and an equality "the lane n=2" holds when an inequality "L1<d≤L1+L2" is satisfied. When an inequality "d<0" or "d>L1+L2" is satisfied, the subject vehicle is traveling out of the lane.

As for a distance do between a left white line of the lane in which the subject vehicle is traveling and the center of the subject vehicle, an equality "d1=d" holds when an equality "n=1" is satisfied, and an equality "d2=d−L1" holds when an equality "n=2" is satisfied.

A general formula for calculating the lane n in which the subject vehicle is traveling when an inequality "N>1" holds for the number of lanes N is expressed by the following inequality (1), and a value n(N≥n≥1) satisfying the inequality (1) indicates the lane in which the subject vehicle is traveling.

[Math 1]
$$\sum_{m=1}^{n-1} Lm < d \le \sum_{m=1}^{n} Lm \quad (1)$$

In this case, when the following inequality (2) is satisfied, the subject vehicle is traveling out of the lane.

[Math 2]
$$d \le 0 \text{ or } d > \sum_{m=1}^{N} Lm \quad (2)$$

A general formula for calculating the distance do between the left white line of the lane in which the subject vehicle is traveling and the center of the subject vehicle when the inequality "N>1" holds for the number of lanes N is expressed by the following equality (3).

[Math 3]
$$dn = d - \sum_{m=1}^{n-1} Lm \quad (3)$$

A general formula for calculating the lane in which the subject vehicle is traveling when the lane width of each lane is L1 is expressed by the following inequality (4), and a value n (N≥n≥1) satisfying the inequality (4) indicates the lane in which the subject vehicle is traveling.

$$(n-1) \cdot L1 < d \le n \cdot L1 \quad (4)$$

In this case, when an inequality "d≤0" or "d>N−L1" is satisfied, the subject vehicle is traveling out of the lane.

The distance dn between the left white line of the lane in which the subject vehicle is traveling and the center of the subject vehicle when the lane width of each lane is L1 is expressed by the following equality (5).

$$dn = d - (n-1) \cdot L1 \quad (5)$$

The surrounding environment-corresponding traveling lane estimation unit 3 can estimate the lane in which the subject vehicle is traveling and the lateral position of the subject vehicle in the lane in the above-mentioned manner.

Figure 7:
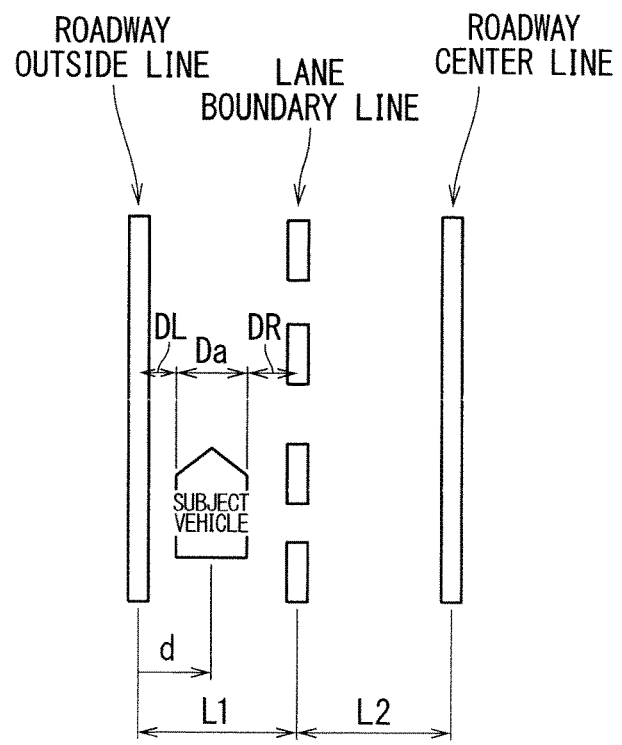
FIG. 7 is a diagram for explaining a lateral position of the subject vehicle in the lane in Embodiment 1 of the present invention.

When the subject vehicle is traveling in the lane having the lane width L1 as illustrated in FIG. 7, the lateral position of the subject vehicle is expressed as the distance d between the center of the roadway outside line located to the left of the subject vehicle in the traveling direction and the center of the subject vehicle. The lateral position, however, can be defined in various ways depending on the position of a starting point from which the lateral position is measured. For example, the lateral position can be defined as the distance between the center of the roadway center line and the center of the subject vehicle, the distance between the center of the lane boundary line and the center of the subject vehicle, or the like. As the lanes are usually designed to have the same lane width, an equality "L1=L2" usually holds in FIG. 7.

For example, as illustrated in FIG. 7, when Da denotes the width of the subject vehicle, DL denotes the distance between a left side of the subject vehicle and the center of the left line (the roadway outside line in the example of FIG. 7), and DR denotes the distance between a right side of the subject vehicle and the right line (the lane boundary line in the example of FIG. 7), the relationships shown in the following equalities (6) and (7) are satisfied.

$$DL = d - Da/2 \quad (6)$$

$$DR = L1 - (d + Da/2) \quad (7)$$

For example, in the LKAS, traveling of the subject vehicle is controlled so that DL and DR are each equal to or smaller than a certain distance. In the LDWS, a lane departure alert is issued when DL or DR is equal to or smaller than a certain distance, and the subject vehicle is facing in a lane departure direction.

Referring back to FIG. 5, in step S13, the traveling lane final determination unit 4 makes a final determination of the lane in which the subject vehicle is traveling and the lateral position of the subject vehicle in the lane.

In step S14, the information output unit 5 outputs, to the driver assist apparatus 9, information on the lane in which the subject vehicle is traveling and information on the lateral position of the subject vehicle in the lane.

Figure 8:
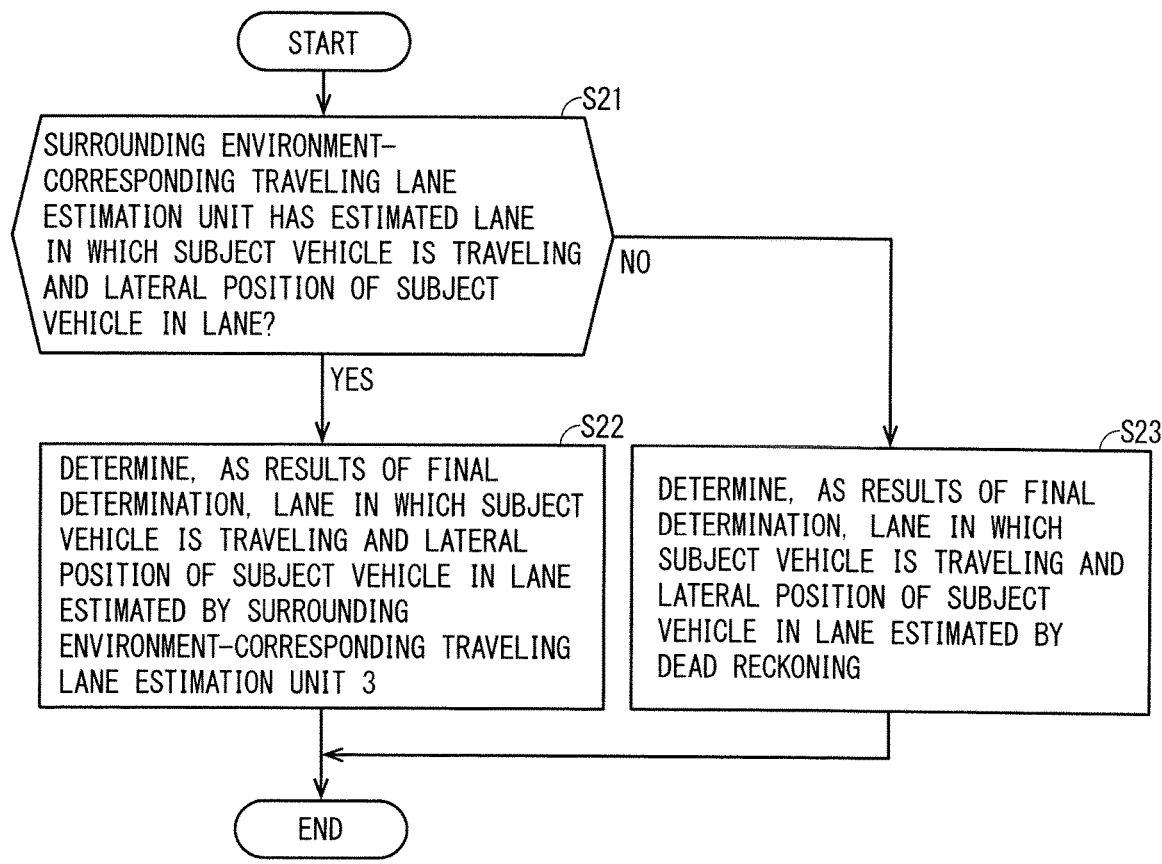
FIG. 8 is a flowchart showing an example of the operation of a traveling lane final determination unit in Embodiment 1 of the present invention.

FIG. 8 is a flowchart showing an example of the operation of the traveling lane final determination unit 4. FIG. 8 shows details of processing in step S13 of FIG. 5.

In step S21, the traveling lane final determination unit 4 determines whether the surrounding environment-corresponding traveling lane estimation unit 3 has estimated the lane in which the subject vehicle is traveling and the lateral position of the subject vehicle in the lane. When the surrounding environment-corresponding traveling lane estimation unit 3 has estimated the lane in which the subject vehicle is traveling and the lateral position of the subject vehicle in the lane, processing proceeds to step S22. On the other hand, when the surrounding environment-corresponding traveling lane estimation unit 3 has not estimated the lane in which the subject vehicle is traveling and the lateral position of the subject vehicle in the lane, processing proceeds to step S23. An example of the case where the surrounding environment-corresponding traveling lane estimation unit 3 has not estimated the lane in which the subject vehicle is traveling and the lateral position of the subject vehicle in the lane includes a case where the surrounding environment detection apparatus 7 has failed to detect any road structures.

In step S22, the traveling lane final determination unit 4 determines, as the results of the final determination, the lane in which the subject vehicle is traveling and the lateral position of the subject vehicle in the lane estimated by the surrounding environment-corresponding traveling lane estimation unit 3.

In step S23, the surrounding environment-corresponding traveling lane estimation unit 3 estimates the lane in which the subject vehicle is traveling and the lateral position of the subject vehicle in the lane by dead reckoning based on the road shape (road information) stored in the map DB 6 and a moving direction of the subject vehicle (information on the behavior of the subject vehicle) obtained from the sensor signal. The traveling lane final determination unit 4 determines, as the results of the final determination, the results of estimation by the surrounding environment-corresponding traveling lane estimation unit 3.

For example, when a negative determination is made after consecutive affirmative determinations in step S21, the surrounding environment-corresponding traveling lane estimation unit 3 performs dead reckoning using, as a starting point, the lane in which the subject vehicle is traveling and the lateral position of the subject vehicle in the lane in the latest affirmative determination in step S21.

The lane recognition apparatus 1 can accurately recognize the lane in which the subject vehicle is traveling and the lateral position of the subject vehicle in the lane in the above-mentioned manner.

MODIFICATIONS

Modifications (Modifications 1 to 11) of the lane recognition apparatus 1 will be described next.

Modification 1

Although the case where the information output unit 5 outputs, to the driver assist apparatus 9, the information on the lane in which the subject vehicle is traveling and the information on the lateral position of the subject vehicle in the lane is described in step S14 of FIG. 5, the output information is not limited to that in this case, and the information output unit 5 may output, to the driver assist apparatus 9, only the information on the lane in which the subject vehicle is traveling.

For example, when the driver assist apparatus 9 is a navigation system providing route guidance for each lane, the navigation system requires only the information on the lane in which the subject vehicle is traveling. Thus, in this case, the information output unit 5 may output, to the driver assist apparatus 9, only the information on the lane in which the subject vehicle is traveling. That is to say, the information output unit 5 may output information that the driver assist apparatus 9 requires.

Modification 2

Although the case where the traveling lane final determination unit 4 estimates the lane in which the subject vehicle is traveling and the lateral position of the subject vehicle in the lane by dead reckoning based on the road shape stored in the map DB 6 and the moving direction of the subject vehicle obtained from the sensor signal when the surrounding environment-corresponding traveling lane estimation unit 3 has not estimated the lane in which the subject vehicle is traveling and the lateral position of the subject vehicle in the lane is described in FIG. 8, processing is not limited to that in this case.

For example, when the surrounding environment-corresponding traveling lane estimation unit 3 has not estimated the lane in which the subject vehicle is traveling and the lateral position of the subject vehicle in the lane, the traveling lane final determination unit 4 may determine that "detection of the subject vehicle position is not possible". In this case, the information output unit 5 may output information indicating that "detection of the subject vehicle position is not possible" to the driver assist apparatus 9. Upon receipt of the information indicating that "detection of the subject vehicle position is not possible" from the information output unit 5, the driver assist apparatus 9 can inform the driver that "driving assistance is suspended", for example.

The driver assist apparatus 9 can select an appropriate driving assistance method in the above-mentioned manner.

Modification 3

In addition to the information on the lane in which the subject vehicle is traveling and the information on the lateral position of the subject vehicle in the lane, the information output unit 5 may output, to the driver assist apparatus 9, information on an absolute position of the subject vehicle, information on the road shape ahead of the subject vehicle, and the like. The information on the absolute position of the subject vehicle is herein information on the subject vehicle position calculated by the subject vehicle position calculation unit 2, and the information on the road shape ahead of the subject vehicle is herein information on the road shape acquired from the map DB 6 based on the subject vehicle position calculated by the subject vehicle position calculation unit 2.

The driver assist apparatus 9 can provide a high level of driving assistance as the driver assist apparatus 9 is provided with a wide variety of information in the above-mentioned manner. For example, the driver assist apparatus 9 can perform a high level of semiautomatic traveling control in accordance with a curve or a road gradient. The driver assist apparatus 9 can display information useful to the driver (e.g., information saying "curve ahead").

Modification 4

The surrounding environment detection apparatus 7 may acquire, from the road structure DB 8, road information corresponding to the subject vehicle position calculated by the subject vehicle position calculation unit 2. With such configuration, the surrounding environment detection apparatus 7 can know any road structure to be detected at the subject vehicle position calculated by the subject vehicle position calculation unit 2 or the features of the road structure, leading to improvement in accuracy of detection of the road structure.

Modification 5

As described above, the road structure DB 8 stores, as the road information, the distance between the roadway outside line and the sidewalk, the height of the sidewalk, the distance between the roadway outside line and the side wall, the height of the side wall, the distance between the roadway outside line and the dividing strip, the height of the dividing strip, and the like. The road structure DB 8 stores information on not only a continuously high road structure, such as a side wall, but also a continuously low road structure, such as a sidewalk, as described above, and thus details of the road structures can be known. When a plurality of surrounding environment detection apparatuses 7 of different schemes are installed in the subject vehicle, one of the surrounding environment detection apparatuses 7 suitable for detection of a specific road structure can be selected. For example, a ultrasonic sensor can be selected for detection of a large road structure, such as a side wall, a laser radar can be selected for detection of a road structure requiring resolution, and a millimeter wave radar can be selected for detection of a slightly wide-range road structure.

Modification 6

The road structure DB 8 may store information on an installation pattern and an installation range of road structures, such as guard rails and reflectors, installed repeatedly at regular intervals. The information on the installation pattern is herein information indicating intervals in meters at which the road structures are installed, for example, and the information on the installation range is herein information indicating a range over which the road structures are installed. The surrounding environment-corresponding traveling lane estimation unit 3 estimates the lane in which the subject vehicle is traveling and the lateral position of the subject vehicle in the lane based on the information on the installation pattern and the installation range of the road structures.

When the surrounding environment detection apparatus 7 detects the road structures installed repeatedly at regular intervals, periods in which the road structures are detected vary depending on the speed of the subject vehicle. The accuracy of detection of the road structures can thus be improved by collating detection periods of the surrounding environment detection apparatus 7 assumed from the installation pattern of the road structures and the speed of the subject vehicle, theoretical detection periods obtained by dividing the regular intervals at which the road structures are arranged repeatedly by the speed of the subject vehicle, and actual detection periods of the surrounding environment detection apparatus 7.

Modification 7

The road structure DB 8 may store, as sensing reference information, information on the intensity or a detection pattern of a detection signal expected to be detected by the surrounding environment detection apparatus 7 based on the material, the shape, or the color of the road structure. When the surrounding environment detection apparatus 7 is the laser radar, for example, the surrounding environment detection apparatus 7 senses the surroundings by emitting light and detecting reflection of the emitted light, and the intensity of reflection of the light is referenced to know information on the position of the road structure as it varies depending on the material of the road structure.

The same applies to reflection of a radio wave when the surrounding environment detection apparatus 7 is the millimeter wave radar and to reflection of a sound wave when the surrounding environment detection apparatus 7 is the ultrasonic sensor.

The intensity or the detection pattern of the detection signal detected by the surrounding environment detection apparatus 7 varies depending on weather or time, and thus the road structure DB 8 may store the sensing reference information in accordance with the weather or time.

Figure 9:
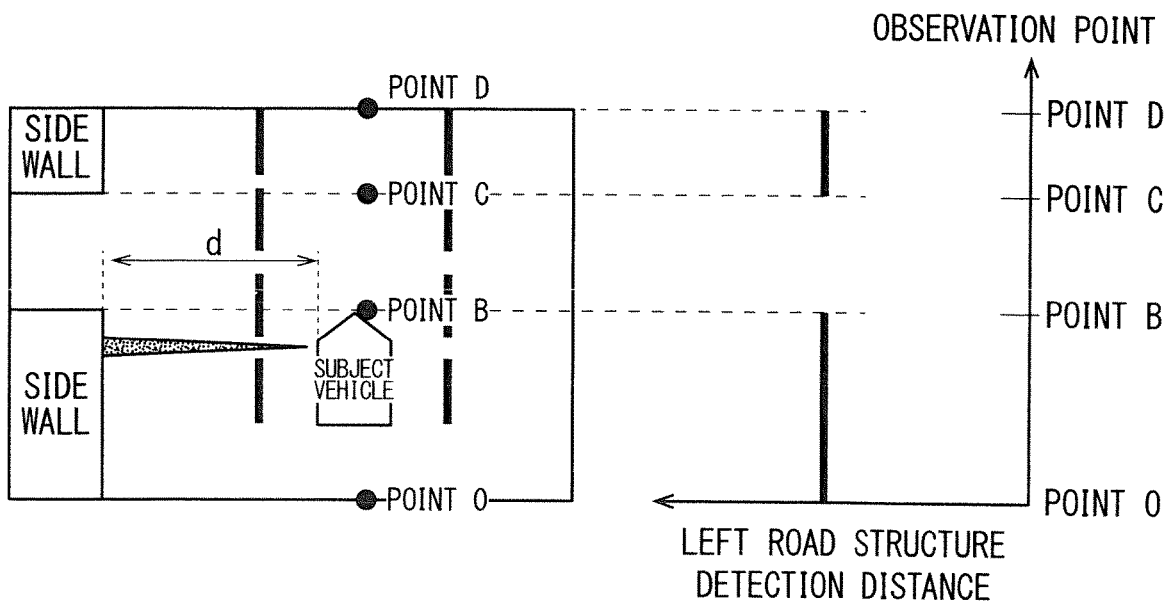
FIG. 9 is a diagram for explaining Modification 7 of Embodiment 1 of the present invention.

For example, as illustrated in FIG. 9, the presence or absence of a side wall changes at points B and C, and thus the distance between the subject vehicle and the side wall greatly changes at the points B and C. That is to say, the results of detection by the surrounding environment detection apparatus 7 greatly change at the points B and C. As described above, the accuracy of the subject vehicle position can be improved by correcting the subject vehicle position with reference to the point (the points B and C in the example of FIG. 9) at which the results of detection by the surrounding environment detection apparatus 7 greatly change and the road information stored in the road structure DB 8. The accuracy of the lane in which the subject vehicle is traveling and the lateral position of the subject vehicle in the lane is thus improved.

Figure 10:
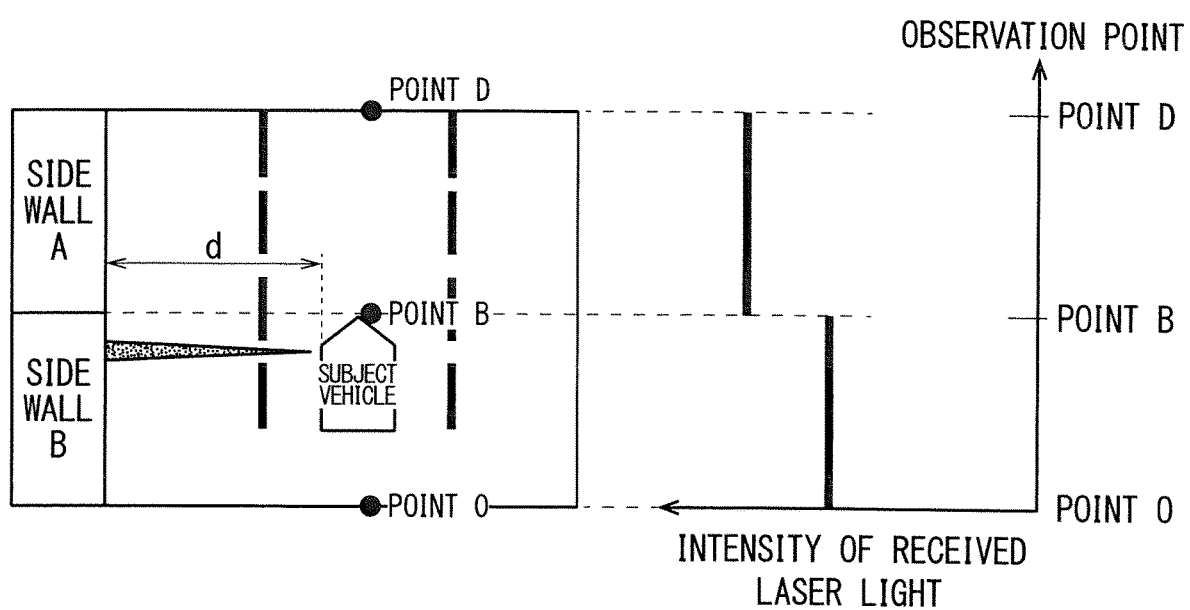
FIG. 10 is a diagram for explaining Modification 7 of Embodiment 1 of the present invention.

For example, as illustrated in FIG. 10, when a side wall A and a side wall B differ in reflectance due to the difference in their materials, the distance between the subject vehicle and the side wall does not change but the amount of received light reflected off the side walls A and B changes at the point B. The accuracy of the subject vehicle position can be improved by correcting the subject vehicle position with reference to the point (the point B in the example of FIG. 10) of the change and the road information stored in the road structure DB 8. The accuracy of the lane in which the subject vehicle is traveling and the lateral position of the subject vehicle in the lane is thus improved.

Modification 8

A plurality of surrounding environment detection apparatuses 7 may be installed in the subject vehicle. When the accuracy of detection of the road structures is reduced when one of the plurality of surrounding environment detection apparatuses 7 is used, the plurality of surrounding environment detection apparatuses 7 may be used to detect the road structures. For example, the ultrasonic sensor has a reduced detection accuracy under windy conditions, and the laser radar has a reduced detection accuracy under foggy conditions, and, in such cases, the accuracy of detection of the road structures is improved by performing detection using the other surrounding environment detection apparatuses 7.

Modification 9

The surrounding environment-corresponding traveling lane estimation unit 3 may determine that "detection is not possible" when the surrounding environment detection apparatus 7 detects a moving object or an obstacle around the subject vehicle, and cannot detect any road structures due to the presence of the moving object or the obstacle. The traveling lane final determination unit 4 may determine that "detection is not possible", and output the information indicating that "detection is not possible" to the driver assist apparatus 9.

When the surrounding environment detection apparatus 7 intermittently detects the road structures, the surrounding environment-corresponding traveling lane estimation unit 3 may estimate the lane in which the subject vehicle is traveling and the lateral position of the subject vehicle in the lane based on chronological information on the past results of detection by the surrounding environment detection apparatus 7, the information on the behavior of the subject vehicle, and the road information stored in the road structure DB 8.

Modification 10

The road structure DB 8 may store map data stored in the map DB 6. This means that the road structure DB 8 and the map DB 6 may integrally be formed.

Embodiment 2

The configuration of a lane recognition apparatus according to Embodiment 2 of the present invention will be described first.

Figure 11:
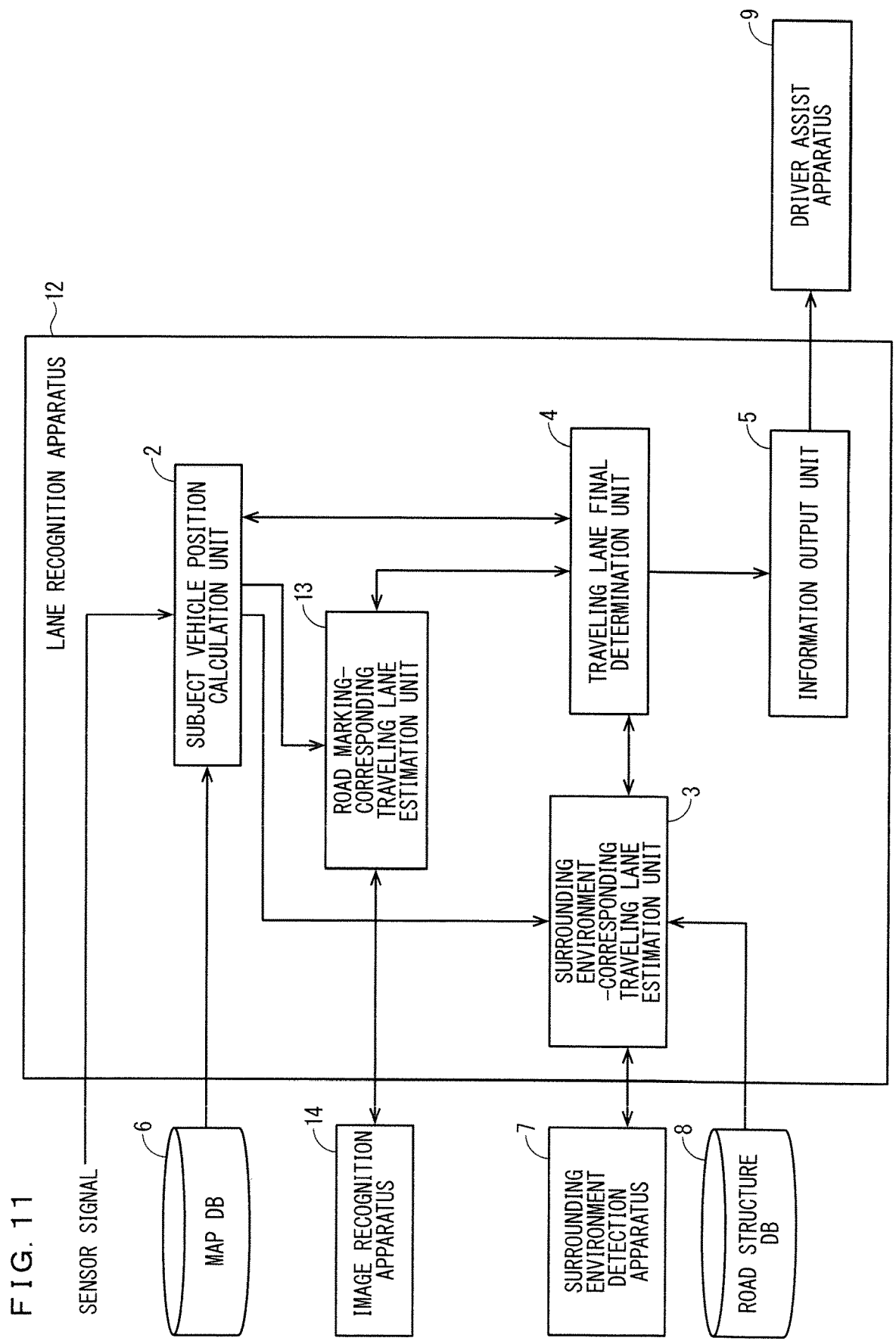
FIG. 11 is a block diagram showing an example of the configuration of a lane recognition apparatus according to Embodiment 2 of the present invention.

FIG. 11 is a block diagram showing an example of the configuration of a lane recognition apparatus 12 according to Embodiment 2.

As shown in FIG. 11, the features of the lane recognition apparatus 12 are that the lane recognition apparatus 12 includes a road marking-corresponding traveling lane estimation unit 13. The other components and the basic operation are similar to those in Embodiment 1, and thus description thereof is omitted herein.

The road marking-corresponding traveling lane estimation unit 13 (a planar pattern-related traveling lane estimation unit) estimates the lane in which the subject vehicle is traveling and the lateral position of the subject vehicle in the lane based on results of recognition by an image recognition apparatus 14.

The image recognition apparatus 14 (an image recognition unit) recognizes white lines on a road by image processing based on an image captured by a camera installed in the subject vehicle. The camera is desired to be installed to be capable of capturing an image of a road ahead of the subject vehicle, but the white lines may be recognized based on an image of a road behind the subject vehicle. The white lines may be recognized using both the image of the road ahead of the subject vehicle and the image of the road behind the subject vehicle. Recognizing the white lines ahead of and behind the subject vehicle can prevent a reduction in detection accuracy caused by the presence of non-subject vehicles, blurring of the white lines, or the like. Although the image recognition apparatus 14 is outside the lane recognition apparatus 12 in FIG. 11, the image recognition apparatus 14 may be included in the lane recognition apparatus 12.

The function of the road marking-corresponding traveling lane estimation unit 13 included in the lane recognition apparatus 12 is achieved by a processing circuit. That is to say, the lane recognition apparatus 12 includes the processing circuit to estimate the lane in which the subject vehicle is traveling and the lateral position of the subject vehicle in the lane based on the results of recognition by the image recognition apparatus 14. The processing circuit is the processor 10 to execute the program stored in the memory 11 (see FIG. 4).

The function of the road marking-corresponding traveling lane estimation unit 13 included in the lane recognition apparatus 12 is achieved by software, firmware, or a combination of the software and the firmware. The software or the firmware is described as the program, and stored in the memory 11. The processing circuit achieves the function of each unit by reading and executing the program stored in the memory 11. That is to say, the lane recognition apparatus 12 includes the memory 11 to store the program that results in performance of a step of estimating the lane in which the subject vehicle is traveling and the lateral position of the subject vehicle in the lane based on the results of recognition by the image recognition apparatus 14. It can be said that the program makes a computer execute procedures or methods of the road marking-corresponding traveling lane estimation unit 13. The memory herein corresponds, for example, to nonvolatile or volatile semiconductor memory, such as RAM, flash memory, EPROM, and EEPROM, a magnetic disk, a flexible disk, an optical disc, a compact disc, a mini disk, a DVD, and the like.

The operation of the lane recognition apparatus 12 will be described next.

Figure 12:
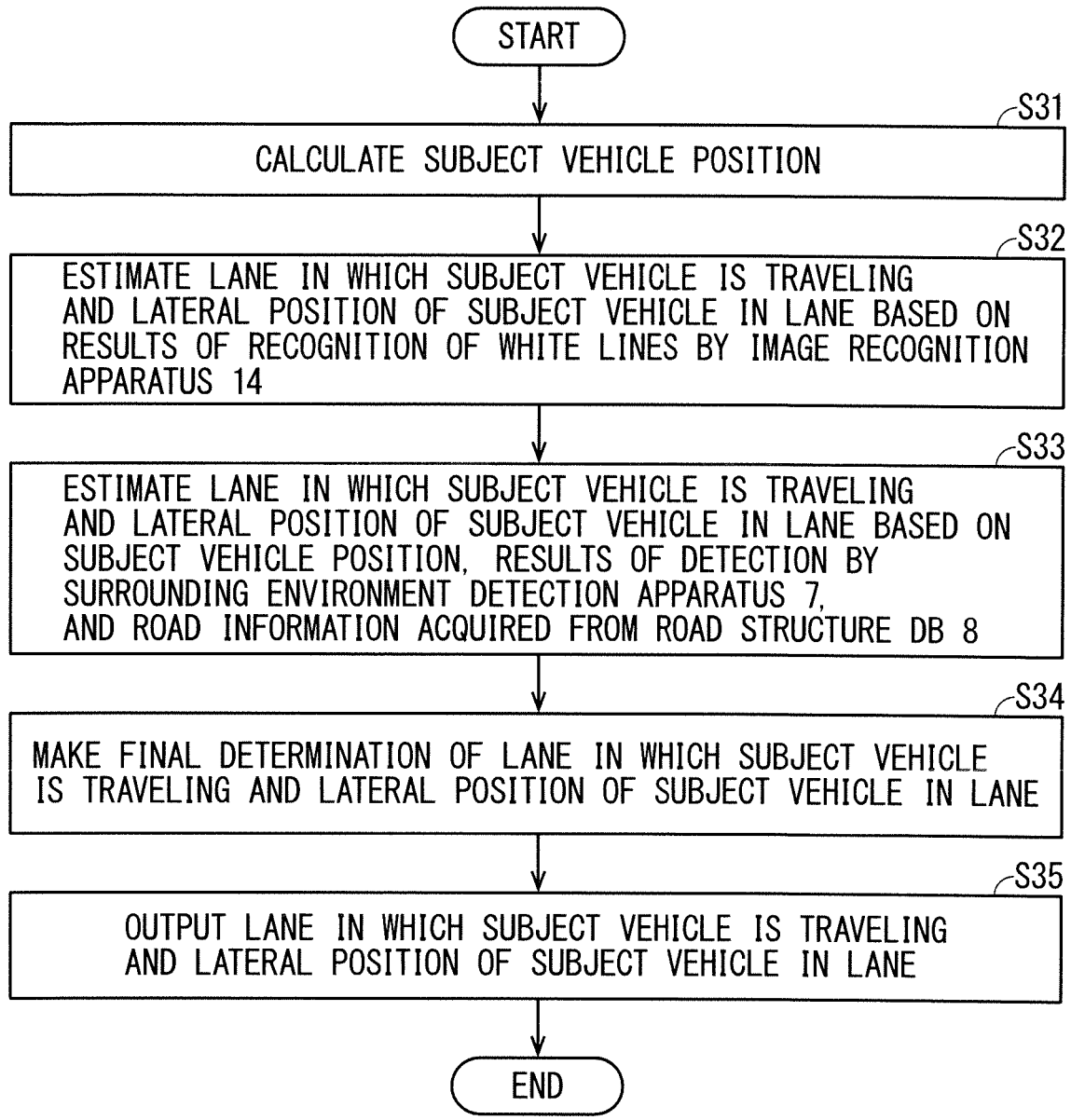
FIG. 12 is a flowchart showing an example of the operation of the lane recognition apparatus according to Embodiment 2 of the present invention.

FIG. 12 is a flowchart showing an example of the operation of the lane recognition apparatus 12. Steps S31, S33, and S35 of FIG. 12 respectively correspond to steps S11, S12, and S14 of FIG. 5, and thus description thereof is omitted herein.

In step S32, the road marking-corresponding traveling lane estimation unit 13 estimates the lane in which the subject vehicle is traveling and the lateral position of the subject vehicle in the lane based on the results of recognition of the white lines by the image recognition apparatus 14. In this case, the image recognition apparatus 14 recognizes the white lines on the road ahead of the subject vehicle, and outputs the results of recognition (subject vehicle surroundings information) to the road marking-corresponding traveling lane estimation unit 13.

In step S34, the traveling lane final determination unit 4 makes a final determination of the lane in which the subject vehicle is traveling and the lateral position of the subject vehicle in the lane.

Figure 13:
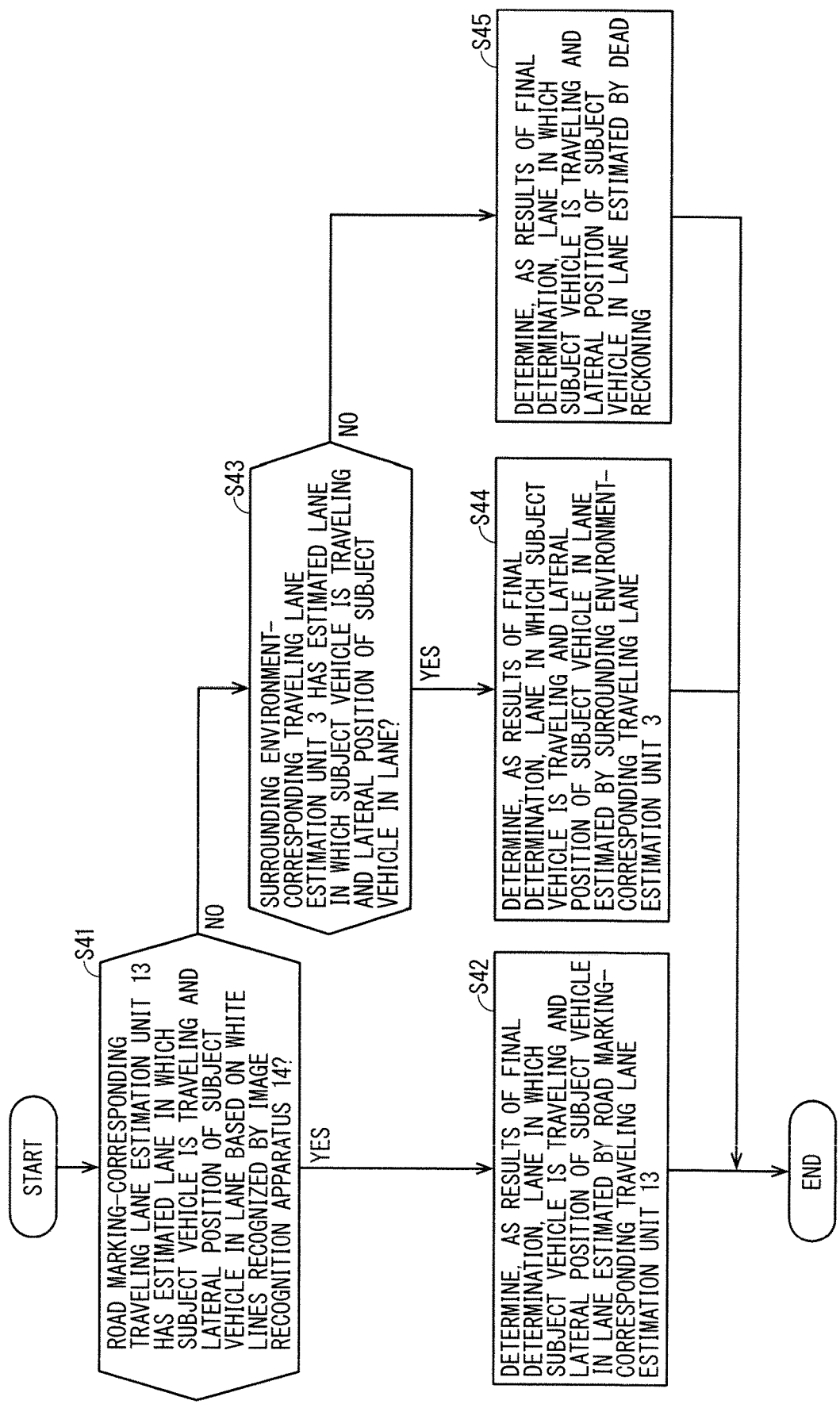
FIG. 13 is a flowchart showing an example of the operation of a traveling lane final determination unit in Embodiment 2 of the present invention.

FIG. 13 is a flowchart showing an example of the operation of the traveling lane final determination unit 4. FIG. 13 shows details of processing in step S34 of FIG. 12. Steps S43, S44, and S45 of FIG. 13 are respectively similar to steps S21, S22, and S23 of FIG. 8, and thus description thereof is omitted herein.

In step S41, the traveling lane final determination unit 4 determines whether the road marking-corresponding traveling lane estimation unit 13 has estimated the lane in which the subject vehicle is traveling and the lateral position of the subject vehicle in the lane based on the white lines recognized by the image recognition apparatus 14. When the road marking-corresponding traveling lane estimation unit 13 has estimated the lane in which the subject vehicle is traveling and the lateral position of the subject vehicle in the lane, processing proceeds to step S42. On the other hand, when the road marking-corresponding traveling lane estimation unit 13 has not estimated the lane in which the subject vehicle is traveling and the lateral position of the subject vehicle in the lane, processing proceeds to step S43. An example of the case where the road marking-corresponding traveling lane estimation unit 13 has not estimated the lane in which the subject vehicle is traveling and the lateral position of the subject vehicle in the lane includes a case where the image recognition apparatus 14 has failed to recognize any white lines.

In step S42, the traveling lane final determination unit 4 determines, as the results of the final determination, the lane in which the subject vehicle is traveling and the lateral position of the subject vehicle in the lane estimated by the road marking-corresponding traveling lane estimation unit 13.

The lane recognition apparatus 12 can recognize the lane in which the subject vehicle is traveling and the lateral position of the subject vehicle in the lane more accurately than the lane recognition apparatus 1 in Embodiment 1 in the above-mentioned manner.

MODIFICATION

A modification (Modification 1) of the lane recognition apparatus 12 will be described next.

Modification 1

An illumination apparatus, such as a headlight, illuminating the surroundings of the subject vehicle may be installed in the subject vehicle. The lane recognition apparatus 12 can improve the accuracy of image recognition by the image recognition apparatus 14 by controlling the illumination apparatus.

The illumination apparatus may be a near-infrared illumination apparatus. The illumination apparatus may emit light at a wavelength at which the accuracy of recognition by the image recognition apparatus 14 improves the most.

Embodiment 3

The configuration of a lane recognition apparatus according to Embodiment 3 of the present invention will be described first.

Figure 14:
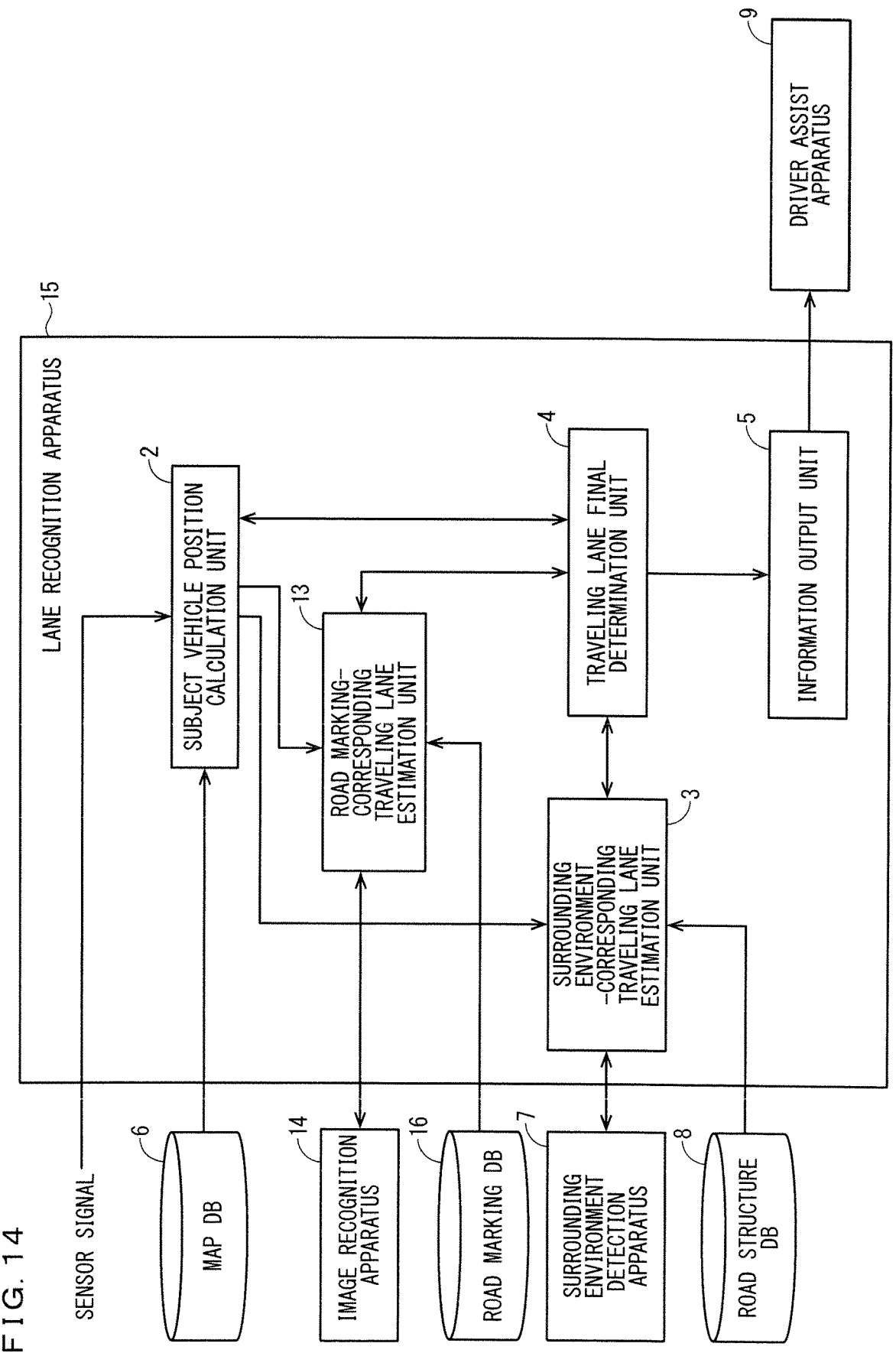
FIG. 14 is a block diagram showing an example of the configuration of a lane recognition apparatus according to Embodiment 3 of the present invention.

FIG. 14 is a block diagram showing an example of the configuration of a lane recognition apparatus 15 according to Embodiment 3.

As shown in FIG. 14, the features of the road marking-corresponding traveling lane estimation unit 13 of the lane recognition apparatus 15 are that the road marking-corresponding traveling lane estimation unit 13 estimates the lane in which the subject vehicle is traveling and the lateral position of the subject vehicle in the lane using road markings stored in a road marking DB 16. The other components and the basic operation are similar to those in Embodiment 2, and thus description thereof is omitted herein.

The road marking DB 16 (a planar pattern storage) stores road markings (planar patterns) indicating traffic restrictions and the like marked on the road using characters, figures, symbols, or lines and the lanes in association with each other. Examples of the road markings include white lines, speed limit signs, no parking/stopping signs, crosswalks, changing lanes-prohibited signs, safety island signs, and the like. The road marking DB 16 includes a storage apparatus, such as a hard disk drive and semiconductor memory. Although the road marking DB 16 is outside the lane recognition apparatus 15 in FIG. 14, the road marking DB 16 may be included in the lane recognition apparatus 15.

The operation of the lane recognition apparatus 15 will be described next.

Figure 15:
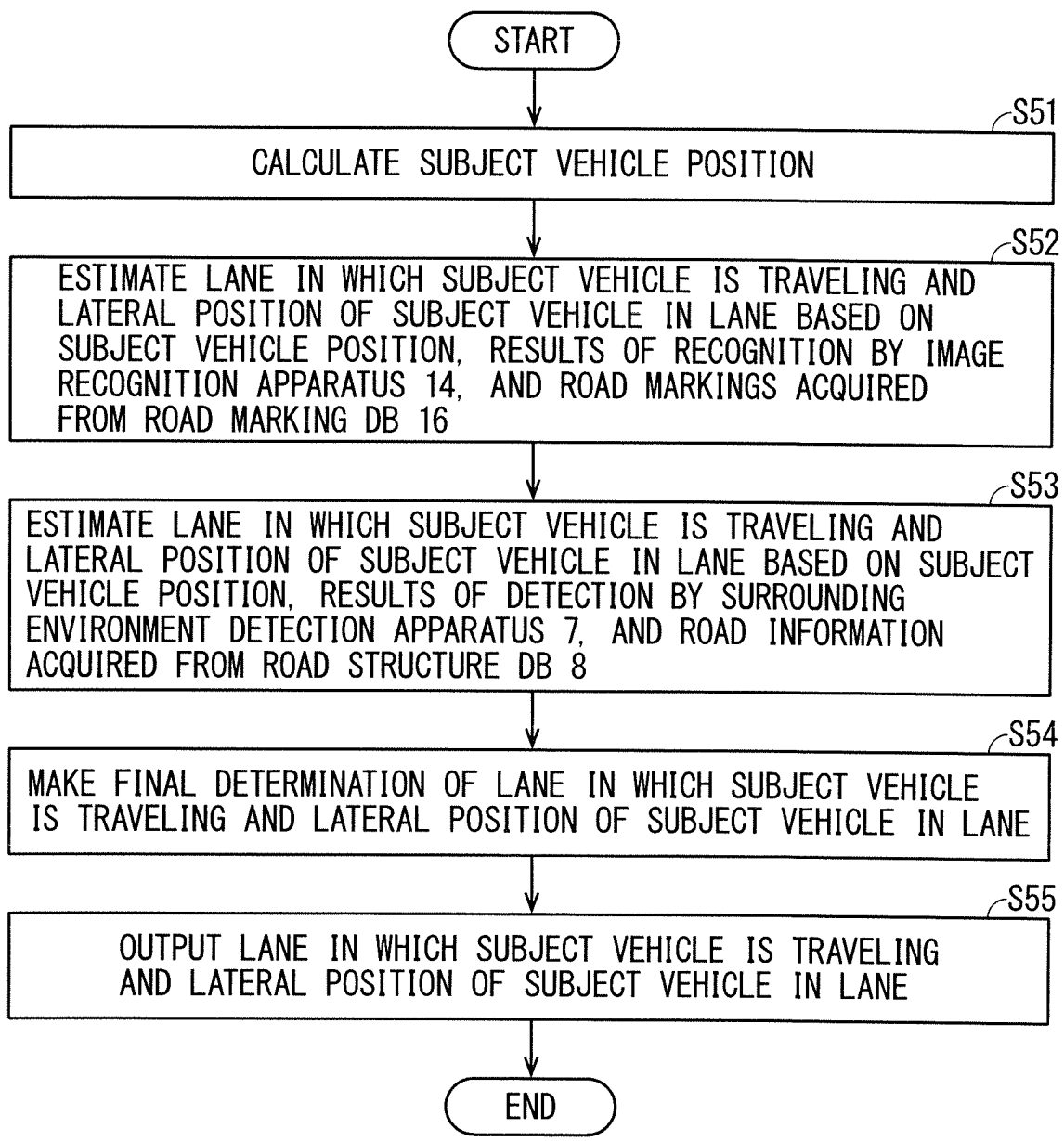
FIG. 15 is a flowchart showing an example of the operation of the lane recognition apparatus according to Embodiment 3 of the present invention.

FIG. 15 is a flowchart showing an example of the operation of the lane recognition apparatus 15. Steps S51, S53, and S55 of FIG. 15 respectively correspond to steps S31, S33, and S35 of FIG. 12, and thus description thereof is omitted herein.

In step S52, the road marking-corresponding traveling lane estimation unit 13 estimates the lane in which the subject vehicle is traveling and the lateral position of the subject vehicle in the lane based on the subject vehicle position, the results of recognition by the image recognition apparatus 14, and road markings acquired from the road marking DB 16. Specifically, the road marking-corresponding traveling lane estimation unit 13 acquires, from the road marking DB 16, road markings (road information) corresponding to the subject vehicle position calculated by the subject vehicle position calculation unit 2. The image recognition apparatus 14 recognizes the road markings at the subject vehicle position calculated by the subject vehicle position calculation unit 2, and outputs the results of recognition (subject vehicle surroundings information) to the road marking-corresponding traveling lane estimation unit 13. The road marking-corresponding traveling lane estimation unit 13 estimates the lane in which the subject vehicle is traveling and the lateral position of the subject vehicle in the lane based on the results of recognition by the image recognition apparatus 14 and the road markings acquired from the road marking DB 16.

In step S54, the traveling lane final determination unit 4 makes a final determination of the lane in which the subject vehicle is traveling and the lateral position of the subject vehicle in the lane.

Figure 16:
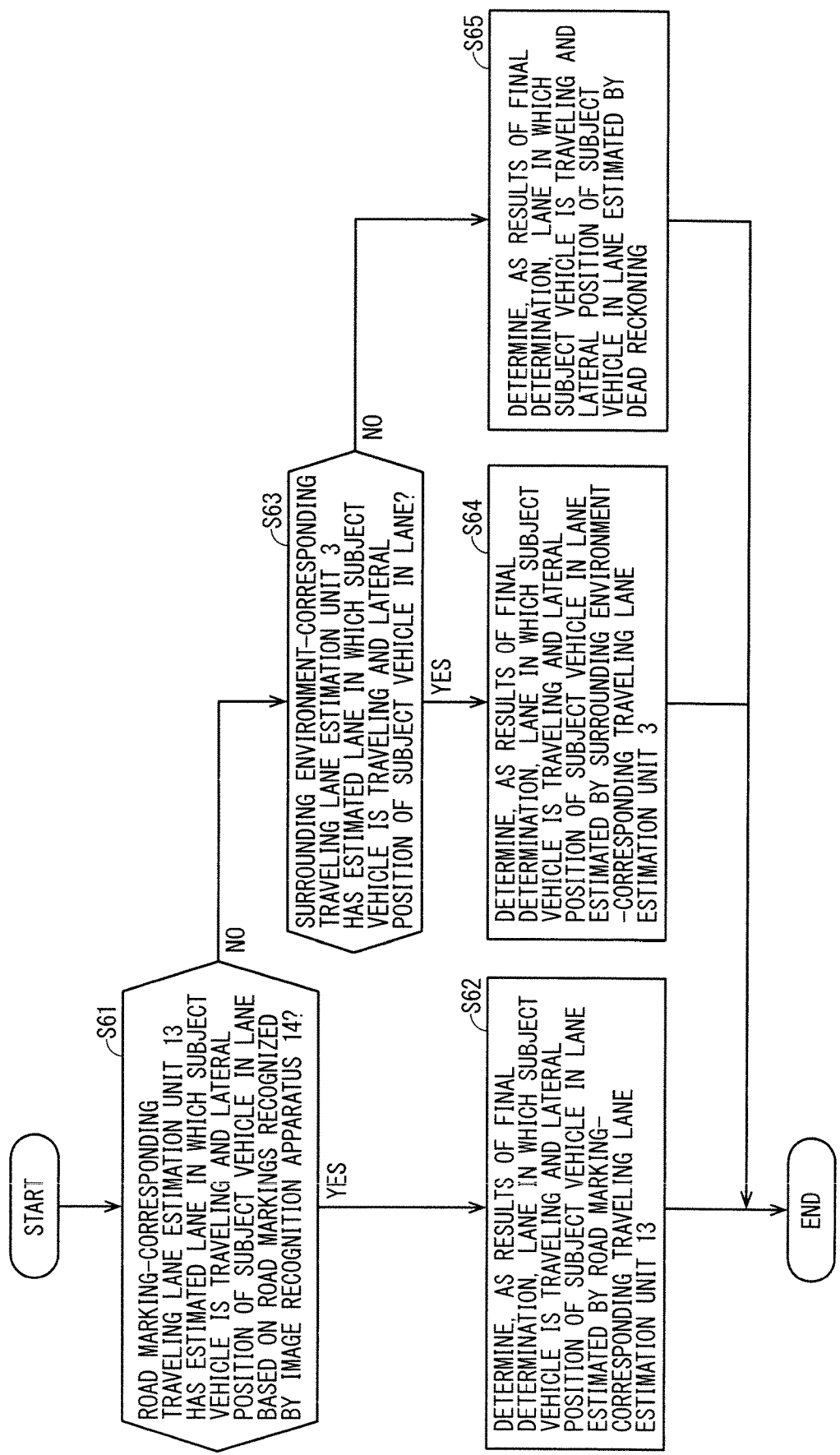
FIG. 16 is a flowchart showing an example of the operation of a traveling lane final determination unit in Embodiment 3 of the present invention.

FIG. 16 is a flowchart showing an example of the operation of the traveling lane final determination unit 4. FIG. 16 shows details of processing in step S54 of FIG. 15. Steps S62, S63, S64, and S65 of FIG. 16 are respectively similar to steps S42, S43, S44, and S45 of FIG. 13, and thus description thereof is omitted herein.

In step S61, the traveling lane final determination unit 4 determines whether the road marking-corresponding traveling lane estimation unit 13 has estimated the lane in which the subject vehicle is traveling and the lateral position of the subject vehicle in the lane based on the road markings recognized by the image recognition apparatus 14. When the road marking-corresponding traveling lane estimation unit 13 has estimated the lane in which the subject vehicle is traveling and the lateral position of the subject vehicle in the lane, processing proceeds to step S62. On the other hand, when the road marking-corresponding traveling lane estimation unit 13 has not estimated the lane in which the subject vehicle is traveling and the lateral position of the subject vehicle in the lane, processing proceeds to step S63. An example of the case where the road marking-corresponding traveling lane estimation unit 13 has not estimated the lane in which the subject vehicle is traveling and the lateral position of the subject vehicle in the lane includes a case where the image recognition apparatus 14 has failed to recognize any road markings.

The lane recognition apparatus 15 can recognize the lane in which the subject vehicle is traveling and the lateral position of the subject vehicle in the lane more accurately than the lane recognition apparatus 12 in Embodiment 2 in the above-mentioned manner. The image recognition apparatus 14 can recognize the distance between the subject vehicle and each of the road markings, leading to improvement in accuracy of the position of the subject vehicle in the traveling direction.

MODIFICATIONS

Modifications (Modifications 1 to 4) of the lane recognition apparatus 15 will be described next.

Modification 1

The illumination apparatus, such as a headlight, illuminating the surroundings of the subject vehicle may be installed in the subject vehicle. The lane recognition apparatus 15 can improve the accuracy of image recognition by the image recognition apparatus 14 by controlling the illumination apparatus.

The illumination apparatus may be the near-infrared illumination apparatus. The illumination apparatus may emit light at a wavelength at which the accuracy of recognition by the image recognition apparatus 14 improves the most.

Modification 2

The surrounding environment-corresponding traveling lane estimation unit 3 may determine that "detection is not possible" or "recognition is not possible" when the surrounding environment detection apparatus 7 or the image recognition apparatus 14 detects a moving object or an obstacle around the subject vehicle, and cannot detect or recognize any road structures or any road markings due to the presence of the moving object or the obstacle. The traveling lane final determination unit 4 may determine that "detection is not possible" or "recognition is not possible", and output the information indicating that "detection is not possible" or "recognition is not possible" to the driver assist apparatus 9.

When the image recognition apparatus 14 intermittently recognizes the road markings, the road marking-corresponding traveling lane estimation unit 13 may estimate the lane in which the subject vehicle is traveling and the lateral position of the subject vehicle in the lane based on chronological information on the past results of recognition by the image recognition apparatus 14, the information on the behavior of the subject vehicle, and the road information stored in the road structure DB 8.

Modification 3

The image recognition apparatus 14 may acquire, from the road marking DB 14, road markings corresponding to the subject vehicle position calculated by the subject vehicle position calculation unit 2. With such configuration, the image recognition apparatus 14 can know any road marking to be recognized at the subject vehicle position calculated by the subject vehicle position calculation unit 2 or the features of the road marking, leading to improvement in accuracy of recognition of the road marking.

Modification 4

The road marking DB 16 may store the map data stored in the map DB 6. This means that the road marking DB 16 and the map DB 6 may integrally be formed.

Alternatively, the map DB 6, the road structure DB 8, and the road marking DB 16 may integrally be formed.

Embodiment 4

The configuration of a lane recognition apparatus according to Embodiment 4 of the present invention will be described first.

Figure 17:
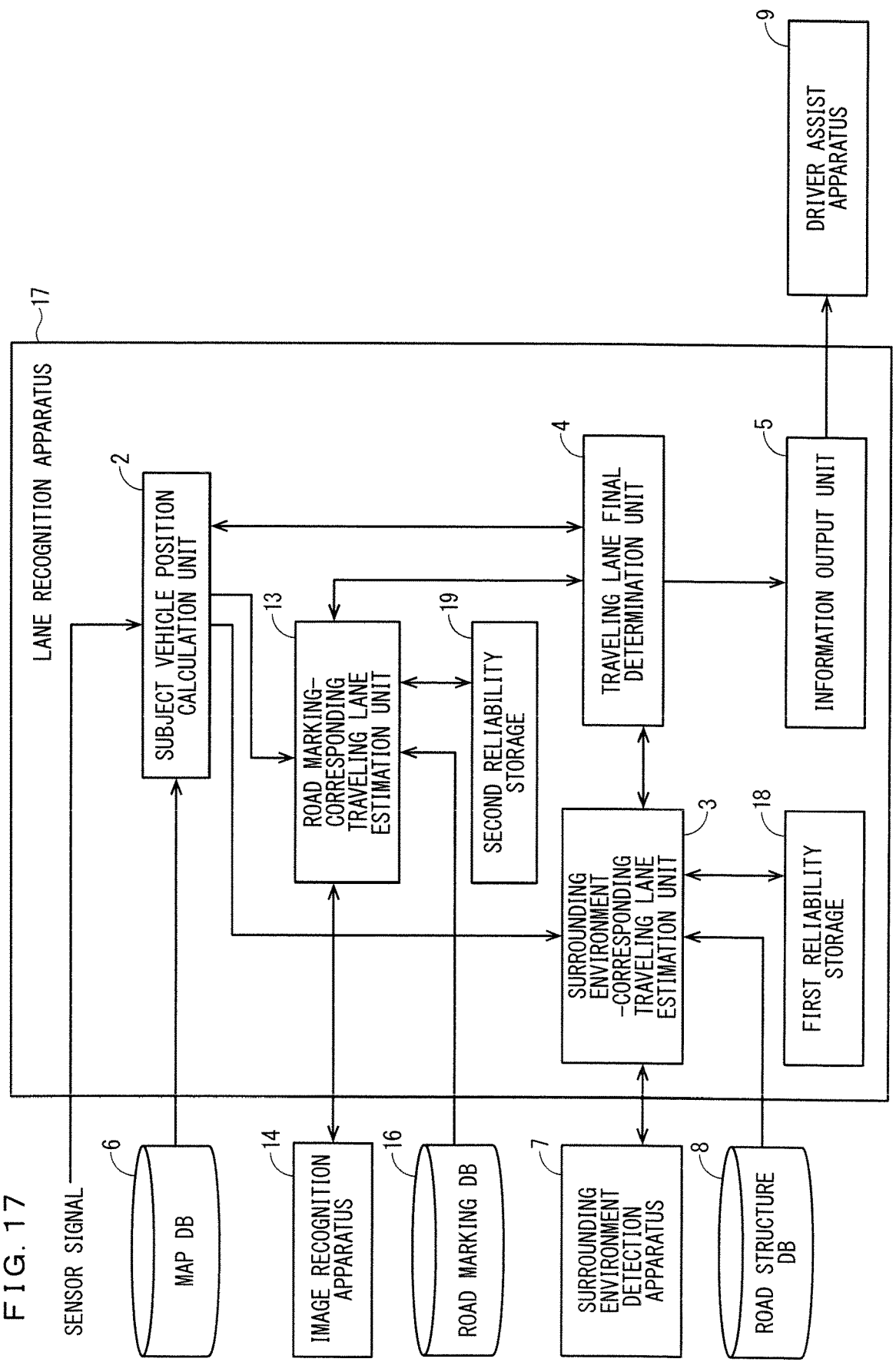
FIG. 17 is a block diagram showing an example of the configuration of a lane recognition apparatus according to Embodiment 4 of the present invention.

FIG. 17 is a block diagram showing an example of the configuration of a lane recognition apparatus 17 according to Embodiment 4.

As shown in FIG. 17, the features of the lane recognition apparatus 17 are that the lane recognition apparatus 17 includes a first reliability storage 18 and a second reliability storage 19. The other components and the basic operation are similar to those in Embodiment 3, and thus description thereof is omitted herein.

The first reliability storage 18 includes a storage apparatus, such as a hard disk drive and semiconductor memory, and stores first reliability calculated by the surrounding environment-corresponding traveling lane estimation unit 3. The first reliability will be described below.

The second reliability storage 19 includes a storage apparatus, such as a hard disk drive and semiconductor memory, and stores second reliability calculated by the road marking-corresponding traveling lane estimation unit 13. The second reliability will be described below.

The operation of the lane recognition apparatus 17 will be described next.

Figure 18:
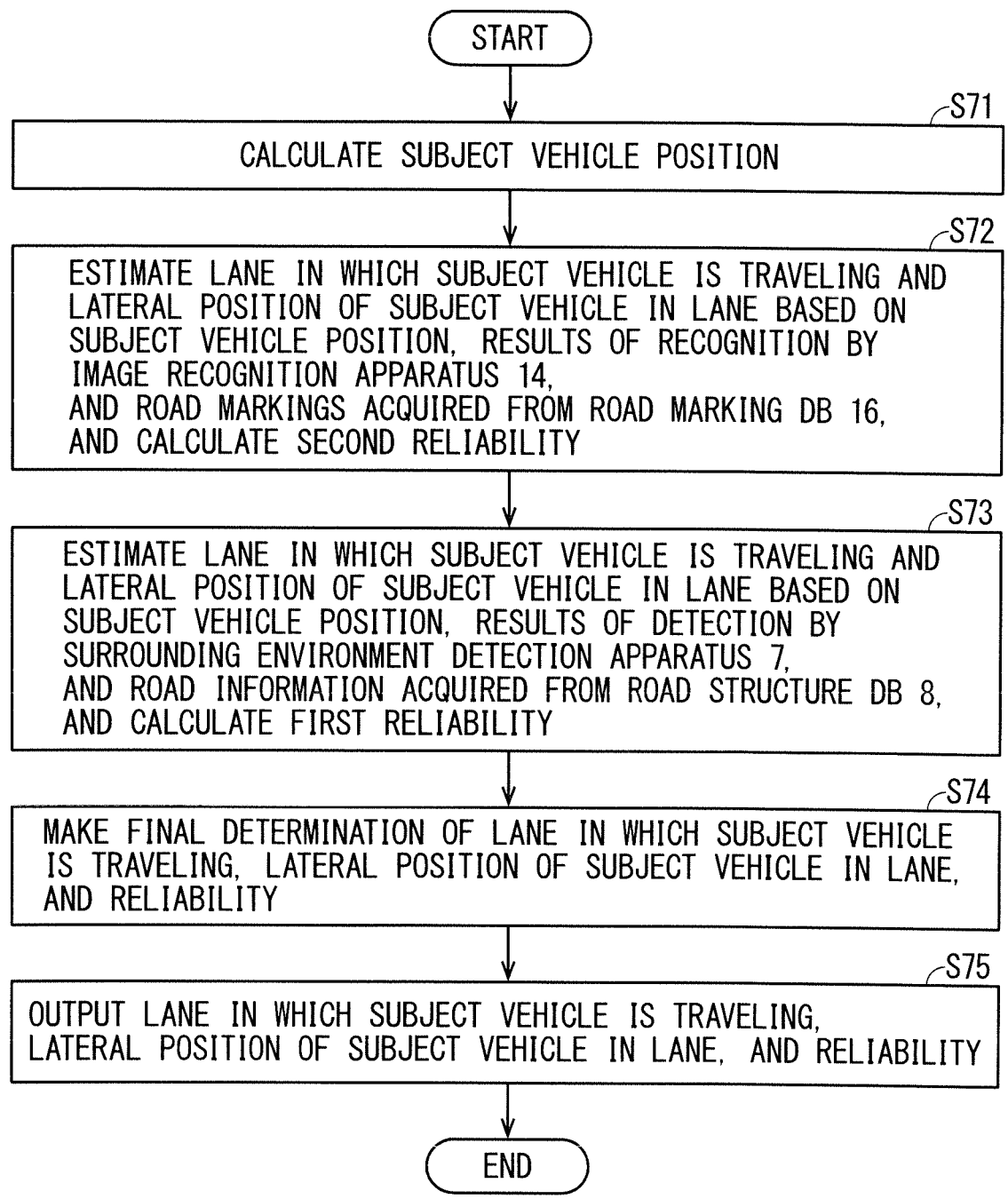
FIG. 18 is a flowchart showing an example of the operation of the lane recognition apparatus according to Embodiment 4 of the present invention.

FIG. 18 is a flowchart showing an example of the operation of the lane recognition apparatus 17. Step S71 of FIG. 18 corresponds to step S51 of FIG. 15, and thus description thereof is omitted herein.

In step S72, the road marking-corresponding traveling lane estimation unit 13 performs processing similar to the processing performed in step S52 of FIG. 15 to estimate the lane in which the subject vehicle is traveling and the lateral position of the subject vehicle in the lane. The road marking-corresponding traveling lane estimation unit 13 also calculates the second reliability. The second reliability calculated by the road marking-corresponding traveling lane estimation unit 13 is stored in the second reliability storage 19.

In step S73, the surrounding environment-corresponding traveling lane estimation unit 3 performs processing similar to the processing performed in step S53 of FIG. 15 to estimate the lane in which the subject vehicle is traveling and the lateral position of the subject vehicle in the lane. The surrounding environment-corresponding traveling lane estimation unit 3 also calculates the first reliability. The first reliability calculated by the surrounding environment-corresponding traveling lane estimation unit 3 is stored in the first reliability storage 18.

In step S74, the traveling lane final determination unit 4 makes a final determination of the lane in which the subject vehicle is traveling, the lateral position of the subject vehicle in the lane, and the reliability based on the lane in which the subject vehicle is traveling and the lateral position of the subject vehicle in the lane estimated by the road marking-corresponding traveling lane estimation unit 13 (hereinafter, also referred to as a second estimated value D2), the lane in which the subject vehicle is traveling and the lateral position of the subject vehicle in the lane estimated by the surrounding environment-corresponding traveling lane estimation unit 3 (hereinafter, also referred to as a first estimated value D1), the first reliability stored in the first reliability storage 18 (hereinafter, also referred to as first reliability P1), the second reliability stored in the second reliability storage 19 (hereinafter, also referred to as second reliability P2), and the lane in which the subject vehicle is traveling and the lateral position of the subject vehicle in the lane estimated in the past by dead reckoning (hereinafter, also referred to as an estimated value history D3).

In step S75, the information output unit 5 outputs, to the driver assist apparatus 9, the lane in which the subject vehicle is traveling, the lateral position of the subject vehicle in the lane, and the reliability.

A parameter used when the reliability is calculated is described herein.

FIG. 19 shows examples of the parameter used when the reliability is calculated.

In FIG. 19, a parameter P1e is a parameter output from the surrounding environment detection apparatus 7, and indicates reliability of the results of detection by the surrounding environment detection apparatus 7.

A parameter P1d is a parameter stored in the road structure DB 8, and indicates reliability (ease of detection) when the surrounding environment detection apparatus 7 detects the road structures. For example, when the number of road structures at a certain point is small, a value of the parameter P1d is small. The value of the parameter P1d increases with increasing number of road structures. The reliability of detection varies depending on the size of each road structure. For example, the reliability of detection of a planar large road structure, such as a side wall, is high, and the reliability of detection of a small low road structure is low.

A parameter P2e is a parameter output from the image recognition apparatus 14, and indicates reliability of the results of recognition by the image recognition apparatus 14.

A parameter P2d is a parameter stored in the road marking DB 16, and indicates reliability (ease of recognition) when the image recognition apparatus 14 recognizes the road markings. For example, when the white lines are blurred, a value of the parameter P2d is small. Information on the state of the road markings, such as blurring of the white lines, is externally acquired through communication.

Figure 20:
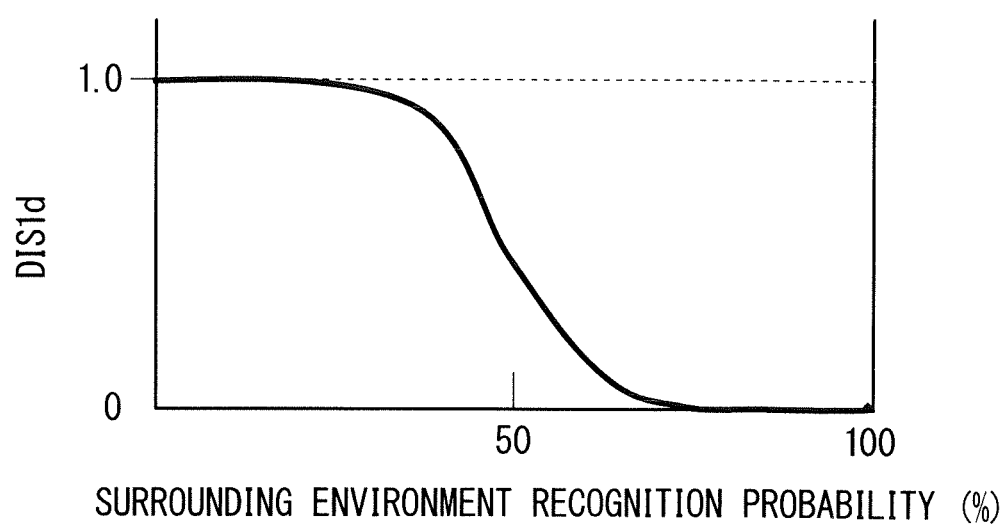
FIG. 20 shows an example of how to determine the parameter for reliability calculation in Embodiment 4 of the present invention.
Figure 21:
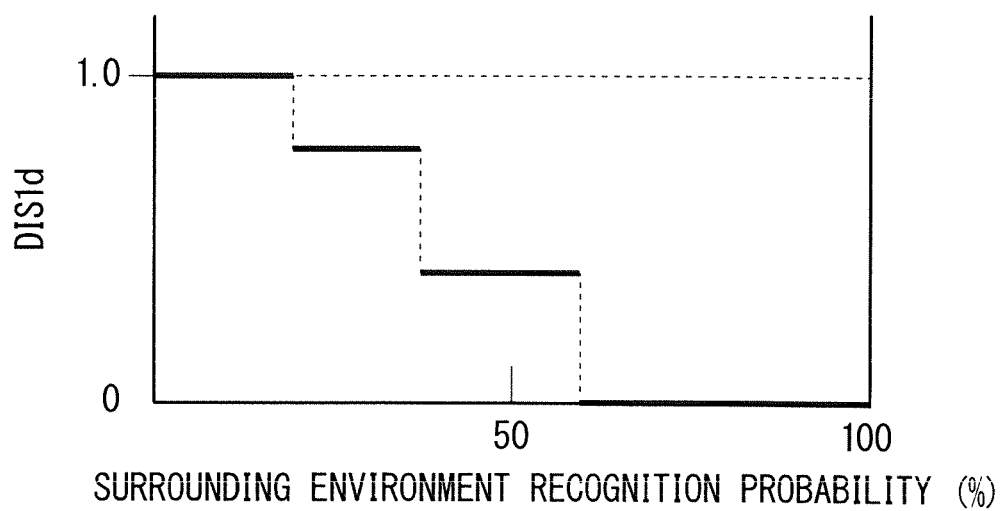
FIG. 21 shows an example of how to determine the parameter for reliability calculation in Embodiment 4 of the present invention.

A parameter DIS1d is a parameter output from the surrounding environment detection apparatus 7, and has a value indicating that reliability of detection is reduced by a factor, such as another moving object or an obstacle around the subject vehicle, inhibiting detection by the surrounding environment detection apparatus 7. For example, as shown in FIGS. 20 and 21, the value of the parameter DIS1d is decreased with increasing probability (frequency) that the surrounding environment detection apparatus 7 can detect a surrounding environment without being affected by another moving object, an obstacle, or the like. The value of the parameter DIS1d is also decreased with increasing number of detectable road structures in the surrounding environment. In other words, when the accuracy of detection of the road structures by the surrounding environment detection apparatus 7 is low, the value of the parameter DIS1d is increased with decreasing accuracy.

A parameter DIS2d is a parameter output from the image recognition apparatus 14, and has a value indicating that reliability of recognition is reduced by a factor, such as another moving object or an obstacle around the subject vehicle and weather, inhibiting recognition by the image recognition apparatus 14. For example, as in FIGS. 20 and 21, the value of the parameter DIS2d is decreased with increasing probability that the image recognition apparatus 14 can recognize the road markings without being affected by another moving object, an obstacle, weather, or the like. In other words, when the accuracy of recognition of the road markings by the image recognition apparatus 14 is low, the value of the parameter DIS2d is increased with decreasing accuracy.

Although a case where the parameter P2e has a higher maximum value than the parameter P1e is described in FIG. 19, maximum values of the parameters are not limited to the values in this case. For example, the parameters P1e and P2e may have the same maximum value.

Calculation of the reliability is described herein.

The surrounding environment-corresponding traveling lane estimation unit 3 calculates the first reliability P1 using, for example, the following equality (8).

$$P1 = \mathrm{MAX}\{(P1e \times P1d - DIS1d), 0\} \quad (8)$$

The road marking-corresponding traveling lane estimation unit 13 calculates the second reliability P2 using, for example, the following equality (9).

$$P2 = \mathrm{MAX}\{(P2e \times P2d - DIS2d), 0\} \quad (9)$$

The operation of the traveling lane final determination unit 4 will be described next.

Figure 22:
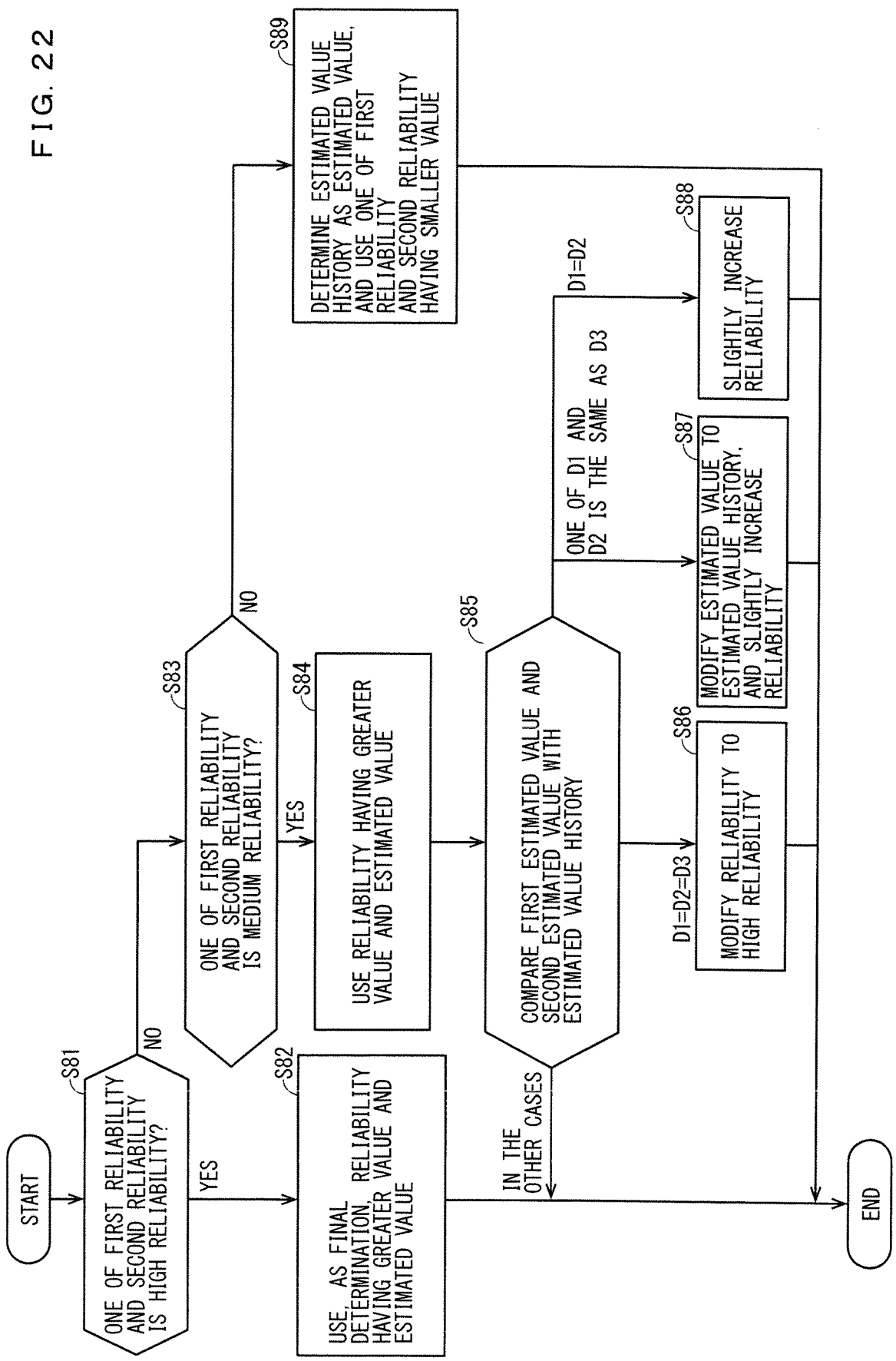
FIG. 22 is a flowchart showing an example of the operation of a traveling lane final determination unit in Embodiment 4 of the present invention.

FIG. 22 is a flowchart showing an example of the operation of the traveling lane final determination unit 4.

In step S81, the traveling lane final determination unit 4 determines whether one of the first reliability P1 and the second reliability P2 is high reliability. Specifically, the traveling lane final determination unit 4 determines whether an inequality MAX(P1, P2)≥Pth_h is satisfied. Pth_h herein indicates a threshold for the high reliability, and reliability having a value greater than the threshold indicates that the results are unconditionally reliable. When the inequality MAX(P1, P2)≥Pth_h is satisfied, processing proceeds to step S82. On the other hand, when the inequality MAX(P1, P2)≥Pth_h is not satisfied, processing proceeds to step S83.

In step S82, the traveling lane final determination unit 4 uses, as the final determination, one of the first reliability P1 and the second reliability P2 having a greater value and an estimated value. In a case where the traveling lane final determination unit 4 determines that the inequality MAX (P1, P2)≥Pth_h is satisfied, an equality D=D1 and P1 holds when an inequality P1>P2 is satisfied, and an equality D=D2 and P2 holds when an inequality P1≤P2 is satisfied. D herein indicates the results of the final determination.

In step S83, the traveling lane final determination unit 4 determines whether one of the first reliability P1 and the second reliability P2 is medium reliability. Specifically, the traveling lane final determination unit 4 determines whether an inequality Pth_h>MAX(P1, P2)≥Pth_1 is satisfied. Pth_1 herein indicates a threshold for the limit of the reliability, and reliability having a value smaller than the threshold indicates that the results are not reliable. When the inequality Pth_h>MAX(P1, P2)≥Pth_1 is satisfied, processing proceeds to step S84. On the other hand, when the inequality Pth_h>MAX(P1, P2)≥Pth_1 is not satisfied, processing proceeds to step S89.

In step S84, the traveling lane final determination unit 4 uses, as the final determination, one of the first reliability P1 and the second reliability P2 having a greater value and an estimated value.

In step S85, the first estimated value D1 and the second estimated value D2 are compared with the estimated value history D3. When the first estimated value D1, the second estimated value D2, and the estimated value history D3 are the same, processing proceeds to step S86. When one of the first estimated value D1 and the second estimated value D2 is the same as the estimated value history D3, processing proceeds to step S87. When the first estimated value D1 and the second estimated value D2 are the same, processing proceeds to step S88. Processing ends in the other cases.

In step S86, the traveling lane final determination unit 4 modifies the reliability to the high reliability.

In step S87, the traveling lane final determination unit 4 modifies the estimated value to the estimated value history D3, and slightly increases the reliability.

In step S88, the traveling lane final determination unit 4 slightly increases the reliability.

When the above-mentioned operation in steps S84 to S88 is summarized, in a case where the inequality Pth_h>MAX (P1, P2)≥Pth_1 is satisfied, the equality D=D1 and P1 holds when the inequality P1>P2 is satisfied, and the equality D=D2 and P2 holds when the inequality P1<P2 is satisfied. When the values D1, D2, and D3 are the same, an equality MAX(P1, P2)=Pth_h is satisfied (step S86). When one of the values D1 and D2 is the same as the value D3, an equality D=D3 holds and an inequality MAX(P1, P2)×α1<Pth_h is satisfied (step S87). When the values D1 and D2 are the same, an inequality MAX(P1, P2)×α2<Pth_h is satisfied (step S88).

In step S89, the traveling lane final determination unit 4 determines the estimated value history D3 as the estimated value, and determines one of the first reliability P1 and the second reliability P2 having a smaller value as the reliability. Specifically, when an inequality MAX(P1, P2)<Pth_1 is satisfied, an equality D=D3 and Min(P1, P2) holds.

The lane recognition apparatus 17 can accurately recognize the lane in which the subject vehicle is traveling and the lateral position of the subject vehicle in the lane by using the reliability in the above-mentioned manner.

A case where the configuration is similar to the configuration of the lane recognition apparatus 15 according to Embodiment 3 is described above, the above-mentioned reliability is applicable to the lane recognition apparatus 1 according to Embodiment 1 and to the lane recognition apparatus 12 according to Embodiment 2.

A case where the reliability is calculated using a plurality of parameters is described above, but the number of parameters used to calculate the reliability may be one.

A case where a plurality of types of reliability are used is described above, but the number of types of reliability may be one.

MODIFICATIONS

Modifications (Modifications 1 to 3) of the lane recognition apparatus 17 will be described next.

Modification 1

Although parameters allowing the first reliability P1 and the second reliability P2 to have a maximum value equal to or greater than one are shown in FIG. 19, the parameters are not limited to the parameters in this case. For example, the value of each of the parameters P1e and P2e may be set to zero to one, and, in this case, the value of each of the parameters DIS1d and DIS2d is set to zero to one.

Although each of the parameters P1d and P2d is expressed with a coefficient in FIG. 19, the parameters P1d and P2d may be constants indicating the maximum values of the reliability P1 and the reliability P2 as shown in the following equalities (10) and (11).

$$P1=MAX[MIN\{(P1e-DIS1d),P1d\},0] \tag{10}$$

$$P2=MAX[MIN\{(P2e-DIS2d),P2d\},0] \tag{11}$$

Although each of the parameters P1d and P2d is expressed with a coefficient in FIG. 19, an intermediate value between the parameters P1e and P1d may be determined as the first reliability P1, and an intermediate value between the parameters P2e and P2d may be determined as the second reliability P2 as shown in the following equalities (12) and (13).

$$P1=MAX[\{(P1e-DIS1d)+P1d\}/2,0] \tag{12}$$

$$P2=MAX[\{(P2e-DIS2d)+P2d\}/2,0] \tag{13}$$

The parameter P2e may be prioritized over the parameter P1e as shown in the following equalities (14) and (15) or in the following equalities (16) and (17).

$$P1=MAX[\{(P1e-DIS1d)+2P1d\}/3,0] \tag{14}$$

$$P2=MAX[\{2\cdot(P2e-DIS2d)+P2d\}/3,0] \tag{15}$$

$$P1=MAX[MIN\{(P1e-DIS1d),P1d\},0] \tag{16}$$

$$P2=MAX[\{(P2e-DIS2d)+P2d\}/2,0] \tag{17}$$

As for the above-mentioned equalities (8) to (17), appropriate equalities are to be set in accordance with the performance or the type of the surrounding environment detection apparatus 7 and the image recognition apparatus 14. Similarly, as for the values of the parameters shown in FIG. 19, appropriate values are to be set in accordance with the performance or the type of the surrounding environment detection apparatus 7 and the image recognition apparatus 14.

Modification 2

Although a case where the surrounding environment detection apparatus 7 and the image recognition apparatus 14 have the same reliability is described in FIG. 22, the reliability is not limited to the reliability in this case. For example, the results of the image recognition apparatus 14 may be prioritized.

Specifically, in a case where an inequality MIN(P1, P2)≥Pth_h is satisfied, that is, in a case where each of the first reliability P1 and the second reliability P2 is the high reliability, the equality D=D2 and P2 holds.

In a case where the inequality MAX(P1, P2)≥Pth_h and an inequality MIN(P1, P2)<Pth_h are satisfied, that is, in a case where one of the first reliability P1 and the second reliability P2 is the high reliability, the equality D=D1 and P1 holds when the inequality P1>P2 is satisfied, and the inequality D=D2 and P2 holds when the inequality P1≤P2 is satisfied.

In a case where the inequality Pth_h>MAX(P1, P2)≥Pth_1 is satisfied, that is, in a case where each of the first reliability P1 and the second reliability P2 is the medium reliability, the equality D=D2 and P2 holds. When the second estimated value D2 and the estimated value history D3 are the same, however, an equality D=D2 holds and an inequality P2× α1<Pth_h is satisfied.

In a case where an inequality MAX(P1, P2)≥Pth_1 and an inequality MIN(P1, P2)<Pth_1 are satisfied, that is, in a case where one of the first reliability P1 and the second reliability P2 is the medium reliability, the equality D=D1 and P1 holds when the inequality P1>P2 is satisfied, and the inequality D=D2 and P2 holds when the inequality P1≤P2 is satisfied.

In a case where the inequality MAX(P1, P2)<Pth_1 is satisfied, that is, in a case where each of the first reliability P1 and the second reliability P2 is low reliability, an equality D=D3 and P2 holds.

Modification 3

A plurality of surrounding environment detection apparatuses 7 may be installed in the subject vehicle. When the accuracy of detection of the road structures is reduced when one of the plurality of surrounding environment detection apparatuses 7 is used, the plurality of surrounding environment detection apparatuses 7 may be used to detect the road structures. In this case, from among the results of detection by the surrounding environment detection apparatuses 7, the results of detection having the highest reliability may be used.

Information on the detection accuracy may be stored in the road structure DB8 for each of the surrounding environment detection apparatuses 7, and may be used as the reliability of the results of detection by the surrounding environment detection apparatus 7.

The lane recognition apparatus described above is applicable not only to an in-vehicle navigation system, that is, a car navigation system but also to a portable navigation device (PND) that can be mounted on a vehicle and a mobile communication terminal (e.g., a mobile phone, a smartphone, and a tablet terminal), as well as a navigation system or a system other than the navigation system constructed as a system by combining a server and the like as appropriate. In this case, the functions or the components of the lane recognition apparatus are distributed to the functions constructing the above-mentioned system.

Figure 23:
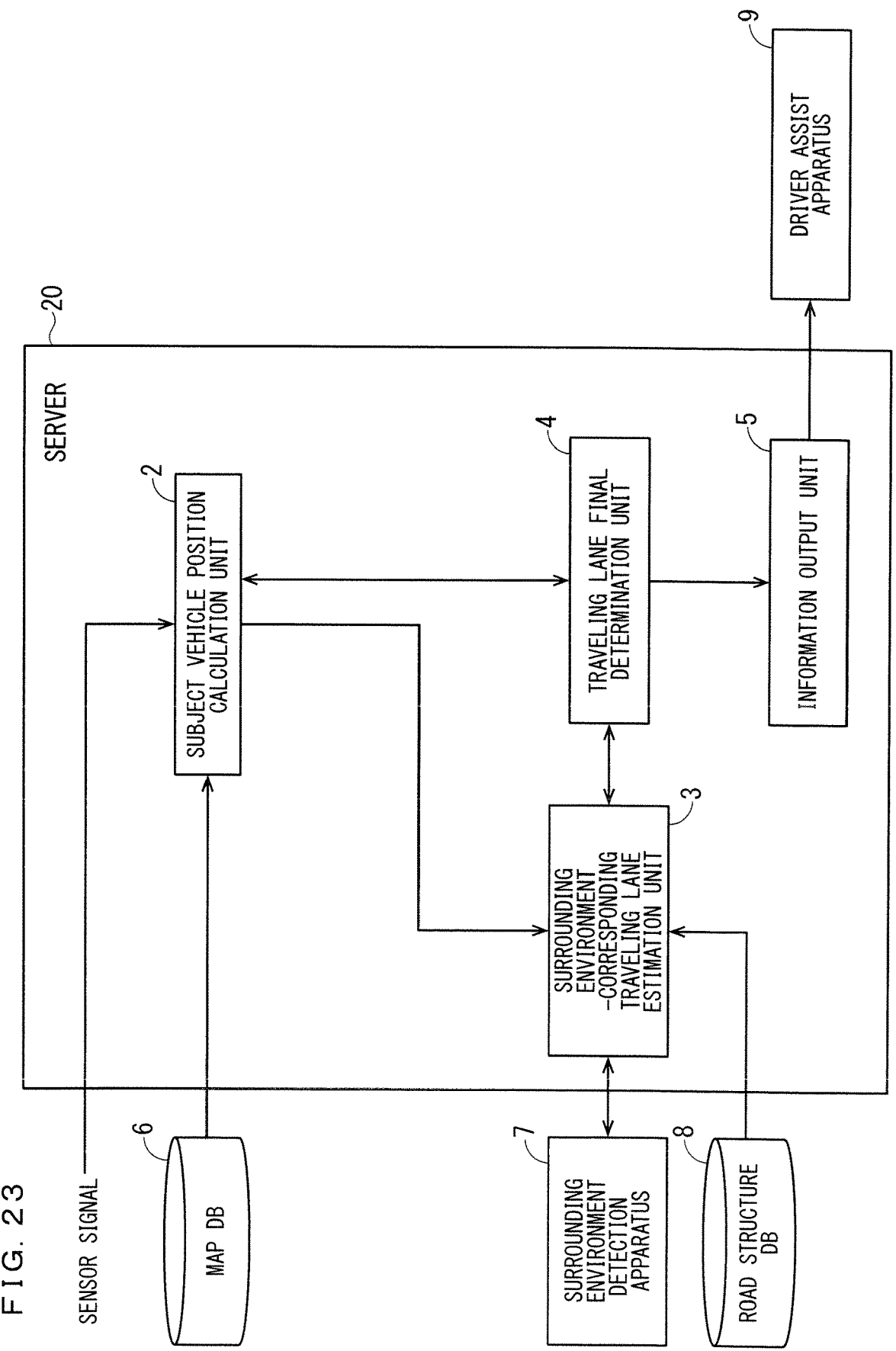
FIG. 23 is a block diagram showing an example of the configuration of a lane recognition system according to an embodiment of the present invention.

Specifically, the functions of the lane recognition apparatus can be located in the server, for example. For example, as shown in FIG. 23, the lane recognition system can be constructed so that a vehicle includes the surrounding environment detection apparatus 7 and the driver assist apparatus 9, and a server 20 includes the subject vehicle position calculation unit 2, the surrounding environment-corresponding traveling lane estimation unit 3, the traveling lane final determination unit 4, and the information output unit 5. The map DB 6 and the road structure DB 8 may be included in one of the vehicle and the server 20, or may be provided independently of the vehicle and the server 20. The components included in the server 20 may be distributed to the server 20 and the vehicle as appropriate. The same applies to the lane recognition apparatuses shown in FIGS. 11, 14, and 17.

Effects similar to the effects obtained in the above-mentioned embodiments can be obtained with the above-mentioned configuration.

Software (a lane recognition method) performing the operation in the above-mentioned embodiments may be incorporated into the server or the mobile communication terminal, for example.

Specifically, the above-mentioned lane recognition method includes: calculating a current position of a subject vehicle; estimating a lane in which the subject vehicle is traveling and a position, in a direction perpendicular to a traveling direction, of the subject vehicle in the lane based on the calculated current position of the subject vehicle, subject vehicle surroundings information indicating a positional relationship between a road structure being a three-dimensional structure existing in relation to a road or a planar pattern being a two-dimensionally visible pattern existing in relation to a road and the subject vehicle, and road information associating the road structure or the planar pattern with a lane of a road in terms of a positional relationship therebetween; and determining the lane in which the subject vehicle is traveling and the position of the subject vehicle in the lane based on results of the estimation, for example.

Effects similar to the effects obtained in the above-mentioned embodiments can be obtained by incorporating, for operation, the software performing the operation in the above-mentioned embodiments into the server or the mobile communication terminal in the above-mentioned manner.

Embodiments of the present invention can be modified or omitted as appropriate within the scope of the invention.

While the invention has been described in detail, the foregoing description is in all aspects illustrative and does not restrict the present invention. It is understood that numerous modifications not having been exemplified can be devised without departing from the scope of the present invention.

EXPLANATION OF REFERENCE SIGNS 1 lane recognition apparatus, 2 subject vehicle position calculation unit, 3 surrounding environment-corresponding traveling lane estimation unit, 4 traveling lane final determination unit, 5 information output unit, 6 map DB, 7 surrounding environment detection apparatus, 8 road structure DB, 9 driver assist apparatus, 10 processor, 11 memory, 12 lane recognition apparatus, 13 road marking-corresponding traveling lane estimation unit, 14 image recognition apparatus, 15 lane recognition apparatus, 16 road marking DB, 17 lane recognition apparatus, 18 first reliability storage, 19 second reliability storage, 20 server.

The invention claimed is:

1. A lane recognition apparatus comprising:
a processor to execute a program; and
a memory to store the program which, when executed by the processor, performs processes of:

calculating a current position of a subject vehicle,
estimating a lane in which the subject vehicle is traveling and a position, in a direction perpendicular to a traveling direction, of the subject vehicle in the lane based on the calculated current position of the subject vehicle, subject vehicle surroundings information indicating a positional relationship between a road structure and the subject vehicle and including a distance between the road structure and the subject vehicle, and road information associating a distance between the road structure and a lane of a road with each position on the road and being stored in a road structure storage, the road structure being a three-dimensional structure existing in relation to the road, wherein the estimation includes acquiring the road information from the road structure storage and acquiring the subject vehicle surroundings information from a surrounding environment detection unit that detects an object including the road structure around the subject vehicle;
determining that the surrounding environment detection unit is not capable e of detecting the road structure; and
determining the lane in which the subject vehicle is traveling and the position of the subject vehicle in the lane based on results of the estimation using only the road information and information on behavior of the subject vehicle.

2. The lane recognition apparatus according to claim 1, wherein
the subject vehicle surroundings information includes, as a planer pattern being a two-dimensionally visible pattern, a line defining the lane or a road marking,
the estimation includes
estimating the lane in which the subject vehicle is traveling and the position of the subject vehicle in the lane based on the current position of the subject vehicle and the line defining the lane or the road marking,
the determination includes determining the lane in which the subject vehicle is traveling and the position of the subject vehicle in the lane based on results of the estimation based on the current position of the subject vehicle, the subject vehicle surroundings information, and the road information and results of the estimation based on the current position of the subject vehicle and the line defining the lane or the road marking, and
the estimation includes acquiring the subject vehicle surroundings information from an image recognition unit that recognizes the planar pattern by image processing.

3. The lane recognition apparatus according to claim 2, wherein
the estimation based on the current position of the subject vehicle and the line defining the lane or the road marking includes acquiring the road information from a planar pattern storage that stores the road information associating the planar pattern with the line defining the lane.

4. The lane recognition apparatus according to claim 1, wherein
the road structure includes at least one of a sidewalk, a side wall, and a dividing strip, and
the road information includes at least one of a distance from a roadway outside line to the sidewalk, a height of the sidewalk, a distance from the roadway outside line to the side wall, a height of the side wall, a distance from the roadway outside line to the dividing strip, and a height of the dividing strip.

5. The lane recognition apparatus according to claim 1, wherein
the road information includes an installation pattern and an installation range of the road structure installed repeatedly at regular intervals.

6. The lane recognition apparatus according to claim 1, wherein
the road information includes sensing reference information expected to be detected by the surrounding environment detection unit based on a material, a shape, or a color of the road structure.

7. The lane recognition apparatus according to claim 6, wherein
the sensing reference information represents intensity or a detection pattern of a detection signal detected by the surrounding environment detection unit.

8. The lane recognition apparatus according to claim 2, wherein
when the image recognition unit is not capable of recognizing the planar pattern, the lane in which the subject vehicle is traveling and the position of the subject vehicle in the lane are estimated based on the road information and information on behavior of the subject vehicle.

9. The lane recognition apparatus according to claim 2, wherein
the determination includes determining the lane in which the subject vehicle is traveling and the position of the subject vehicle in the lane based on at least one of first reliability and second reliability, the first reliability being reliability of the results of the estimation based on the current position of the subject vehicle, the subject vehicle surroundings information, and the road information, the second reliability being reliability of results of the estimation based on the current position of the subject vehicle and the line defining the lane or the road marking.

10. The lane recognition apparatus according to claim 9, wherein the road information includes, as a parameter used when the first reliability is calculated, ease of detection of the road structure by a surrounding environment detection unit.

11. The lane recognition apparatus according to claim 9, wherein
the road information includes, as a parameter used when the second reliability is calculated, case of recognition of the planar pattern by the image recognition unit.

12. The lane recognition apparatus according to claim 10, wherein
at the estimation, the first reliability is decreased with increasing frequency with which the surrounding environment detection unit detects an object other than the road structure.

13. The lane recognition apparatus according to claim 10, wherein
when accuracy of detection of the road structure by the surrounding environment detection unit is low, the first reliability is decreased with decreasing accuracy at the estimation.

14. The lane recognition apparatus according to claim 11, wherein
when accuracy of recognition of the planar pattern by the image recognition unit is low, the second reliability is decreased with decreasing accuracy.

15. The lane recognition apparatus according to claim 1, wherein when executed by the processor, the program further performs a process of outputting the determined lane in which the subject vehicle is traveling and the determined position of the subject vehicle in the lane.

16. A lane recognition method comprising:

calculating a current position of a subject vehicle;

estimating a lane in which the subject vehicle is traveling and a position, in a direction perpendicular to a traveling direction, of the subject vehicle in the lane based on the calculated current position of the subject vehicle, subject vehicle surroundings information indicating a positional relationship between a road structure and the subject vehicle and including a distance between the road structure and the subject vehicle, and road information associating a distance between the road structure and a lane of a road with each position on the road and being stored in a road structure storage, the road structure being a three-dimensional structure existing in relation to the road; wherein the estimation includes acquiring the road information from the road structure storage and acquiring the subject vehicle surroundings information from a surrounding environment detection unit that detects an object including the road structure around the subject vehicle;

determining that the surrounding environment detection unit is not capable of detecting the road structure; and determining the lane in which the subject vehicle is traveling and the position of the subject vehicle in the lane based on results of the estimation using only the road information and information on behavior of the subject vehicle.

17. The lane recognition method according to claim 16, wherein at the estimation, the road information is acquired from the road structure storage, and the subject vehicle surroundings information is acquired from a surrounding environment detection unit that detects an object including the road structure around the subject vehicle.

18. A lane recognition apparatus comprising:

a processor to execute a program; and a memory to store the program which, when executed by the processor, performs processes of, calculating a current position of a subject vehicle, estimating a lane in which the subject vehicle is traveling and a position, in a direction perpendicular to a traveling direction, of the subject vehicle in the lane based on the calculated current position of the subject vehicle, subject vehicle surroundings information indicating a positional relationship between a road structure and the subject vehicle and including a distance between the road structure and the subject vehicle, and road information associating a distance between the road structure and a lane of a road with each position on the road and being stored in a road structure storage, the road structure being a three-dimensional structure existing in relation to the road, and determining the lane in which the subject vehicle is traveling and the position of the subject vehicle in the lane based on results of the estimation, wherein the subject vehicle surroundings information includes, as a planer pattern being a two-dimensionally visible pattern, a line defining the lane or a road marking, the estimation includes estimating the lane in which the subject vehicle is traveling and the position of the subject vehicle in the lane based on the current position of the subject vehicle and the line defining the lane or the road marking, the determination includes determining the lane in which the subject vehicle is traveling and the position of the subject vehicle in the lane based on results of the estimation based on the current position of the subject vehicle, the subject vehicle surroundings information, and the road information and results of the estimation based on the current position of the subject vehicle and the line defining the lane or the road marking, the estimation includes acquiring the subject vehicle surroundings information from an image recognition unit that recognizes the planar pattern by image processing, and when the image recognition unit is not capable of recognizing the planar pattern, the lane in which the subject vehicle is traveling and the position of the subject vehicle in the lane are estimated based on the road information and information on behavior of the subject vehicle.

* * * * *